United States Patent
Yuge et al.

(10) Patent No.: US 8,928,800 B2
(45) Date of Patent: Jan. 6, 2015

(54) IMAGING DEVICE

(71) Applicant: Olympus Imaging Corp., Shibuya-ku, Tokyo (JP)

(72) Inventors: Kazunori Yuge, Saitama (JP); Tetsuya Takagi, Tokyo (JP)

(73) Assignee: Olympus Imaging Corp., Tokyo (JP)

( * ) Notice: Subject to any disclaimer, the term of this patent is extended or adjusted under 35 U.S.C. 154(b) by 93 days.

(21) Appl. No.: 13/688,989

(22) Filed: Nov. 29, 2012

(65) Prior Publication Data

US 2013/0335589 A1    Dec. 19, 2013

(30) Foreign Application Priority Data

Nov. 29, 2011  (JP) .................................. 2011-260809

(51) Int. Cl.
```
H04N 5/262      (2006.01)
H04N 5/222      (2006.01)
G03B 13/00      (2006.01)
H04N 5/232      (2006.01)
H04N 5/225      (2006.01)
G02B 15/14      (2006.01)
G02B 7/02       (2006.01)
```

(52) U.S. Cl.
CPC ........... *H04N 5/225* (2013.01); *H04N 5/23293* (2013.01)
USPC .................. 348/357; 348/240.1; 348/333.12; 348/375; 359/704; 359/826

(58) Field of Classification Search
CPC .............. H04N 5/2251; H04N 5/2254; H04N 5/23209; H04N 5/23219; H04N 5/23296; G02B 7/14; G02B 7/16
USPC ............... 348/240.99–240.3, 333.02, 333.03, 348/333.12, 335, 357, 373, 375; 359/703–4, 826
See application file for complete search history.

(56) References Cited

U.S. PATENT DOCUMENTS

| | | | | |
|---|---|---|---|---|
| 3,772,978 | A * | 11/1973 | Mito | 359/701 |
| 4,893,145 | A * | 1/1990 | Matsuda | 396/137 |
| 5,969,889 | A * | 10/1999 | Iikawa et al. | 359/825 |
| 7,830,422 | B2 * | 11/2010 | Kaneda | 348/240.1 |
| 8,675,120 | B2 * | 3/2014 | Takahashi | 348/345 |
| 2006/0114341 | A1 * | 6/2006 | Morinaga et al. | 348/240.1 |
| 2010/0277620 | A1 * | 11/2010 | Iijima et al. | 348/240.1 |
| 2011/0267503 | A1 * | 11/2011 | Kunishige et al. | 348/240.1 |
| 2012/0013997 | A1 * | 1/2012 | Yamanaka | 359/701 |
| 2013/0141624 | A1 * | 6/2013 | Tomizawa et al. | 348/333.02 |
| 2013/0271860 | A1 * | 10/2013 | Arakawa et al. | 359/823 |

FOREIGN PATENT DOCUMENTS

JP         04-073628        3/1992

* cited by examiner

*Primary Examiner* — Daniel M Pasiewicz
(74) *Attorney, Agent, or Firm* — John C. Pokotylo; Straub & Pokotylo

(57) ABSTRACT

An imaging device comprises a lens barrel including an optical system that collects light from a predetermined viewing area and that defines an optical axis; an imaging unit that receives the light collected by the optical system and generates image data, the image data defining a main image that includes a determined sub area; a ring-shaped operation ring that is provided on an outer circumference of the lens barrel and that is manually rotatable about the optical axis of the optical system; and an area change unit that changes at least one of (A) a size of the determined sub area, or (B) a position of the determined sub area, responsive to a manual operation of the operation ring.

12 Claims, 21 Drawing Sheets

IMAGING DEVICE

CROSS-REFERENCE TO RELATED APPLICATION

This application claims benefit of Japanese Patent Application No. 2011-260809 filed in Japan on Nov. 29, 2011, which is hereby incorporated by reference as if fully set fourth herein.

BACKGROUND

1. Technical Field

This subject matter disclosed here relates to techniques for capturing a subject and generating electronic data by photoelectric conversion.

2. Description of the Related Art

In recent years, imaging devices such as digital cameras are known to have a technique for capturing a subject and, at the same time, record two image data whose fields of view are different from each other (for example, Japanese Unexamined Patent Application Publication No. H4-73628). According to the technique, main image data corresponding to a first area of an imaging unit that is preset in advance and a sub image data corresponding to a second area that is smaller than the first area are alternately read out from the imaging unit so that two image data with different fields of view can be recorded.

SUMMARY

An imaging device according to the present invention includes: a lens barrel including an optical system that collects light from a predetermined viewing area and that defines an optical axis; an imaging unit that receives the light collected by the optical system and generates image data, the image data defining a main image that includes a determined sub-area; a ring-shaped operation ring that is provided on an outer circumference of the lens barrel and that is manually rotatable about the optical axis of the optical system; and an area change unit that changes at least one of (A) a size of the determined sub-area, or (B) a position of the determined sub-area, responsive to a manual operation of the operation ring.

An imaging device according to the present invention includes: a lens barrel including an optical system that collects light from a predetermined viewing area and that defines an optical axis; an imaging unit that receives the light collected by the optical system and generates image data; a post-processor that processes the image data generated by the imaging unit; a controller that controls (1) an image capturing operation of the imaging unit, and (2) a processing operation of the post-processor; a ring-shaped operation ring that is provided on an outer circumference of the lens barrel and that is both manually rotatable about the optical axis of the optical system and manually slideable between first and second positions along a direction of the optical axis; and a parameter change unit that changes a parameter of at least one of the image capturing operation of the imaging unit or the processing operation of the post-processor, responsive to a manual operation of the operation ring.

An imaging device according to the present invention includes: a lens barrel including an optical system that collects light from a predetermined viewing area and that defines an optical axis; an imaging unit that receives the light collected by the optical system and generates image data; a ring-shaped operation ring—being provided on an outer circumference of the lens barrel, —being manually rotatable about the optical axis of the optical system, —having a first operating state under which manual rotation of the ring-shaped operation ring by a user provides a first type of haptic/tactile feedback to the user, and—having a second operating state under which manual rotation of the ring-shaped operation ring by a user provides a second type of haptic/tactile feedback to the user; and a switching unit for changing an operation mode of the ring-shaped operation ring between the first operating state and the second operating state.

The above description, other objects, features, advantages, and technological and industrial importance of the invention will become apparent upon a reading of the following detailed description with accompanying drawings.

BRIEF DESCRIPTION OF THE DRAWINGS

FIGS. 21A and 213 is a flowchart illustrating an outline of processing performed by the imaging device according to a second embodiment of the invention.

DETAILED DESCRIPTION

Figure 1:
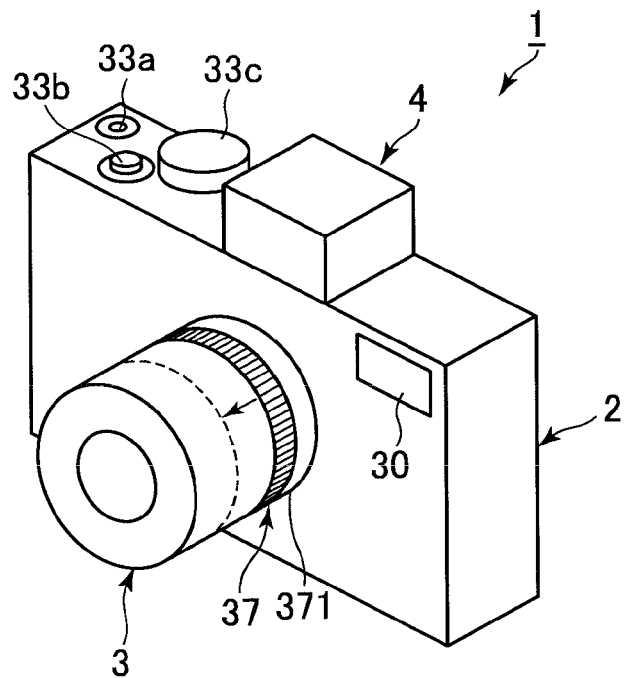
FIG. 1 is a diagram illustrating a configuration of a front-side perspective view of an imaging device facing a subject according to a first embodiment of the invention.

Preferred embodiments of the invention are described below with reference to the accompanying drawings. In the drawings, same numerals denote same components. It should be noted that the drawings are merely schematic and that relationships and ratios of measurements may differ from actual measurements. With respect to relationships in the drawings, portions whose relationships and ratios of measurements may differ each other are included. In the following description, a compact camera is explained as an example of the imaging device according to the invention, however, the invention is not limited by the embodiments.

First Embodiment

Figure 2:
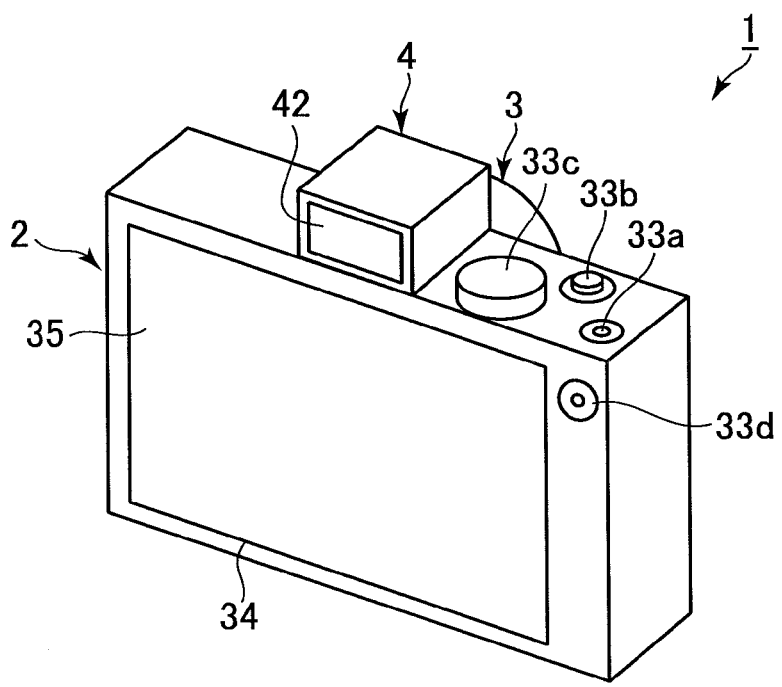
FIG. 2 is a diagram illustrating a configuration of a rear-side perspective view of the imaging device facing a user according to the first embodiment of the invention.
Figure 3:
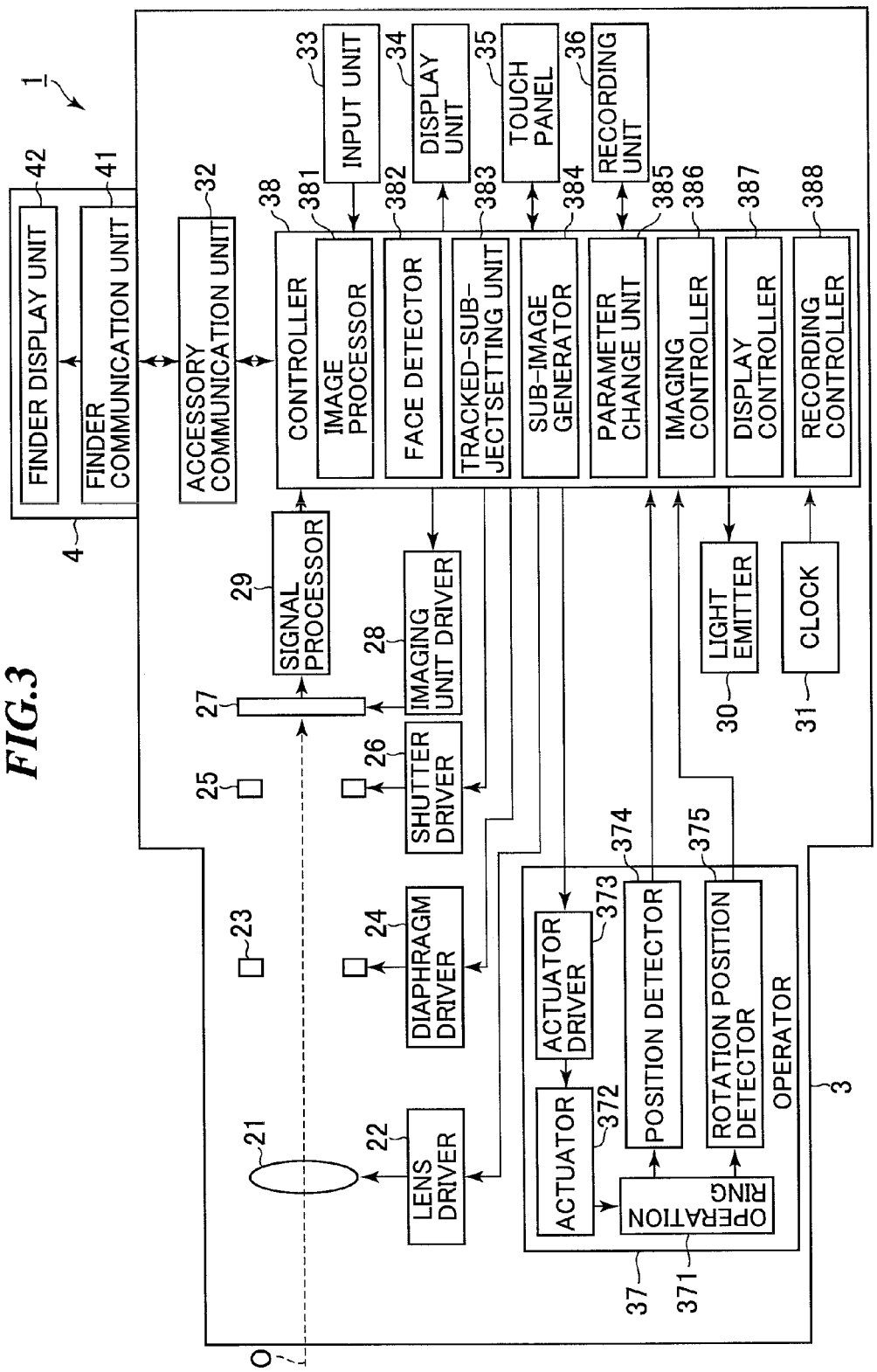
FIG. 3 is a block diagram illustrating a configuration of the imaging device according to the first embodiment of the invention.

FIG. 1 is a diagram illustrating a configuration of a side (front side) of the imaging device facing a subject according to a first embodiment of the invention. FIG. 2 is diagram illustrating a configuration of a side (rear side) of the imaging device facing a user according to the first embodiment of the invention. FIG. 3 is a block diagram illustrating a configuration of the imaging device according to the first embodiment of the invention.

As shown in FIGS. 1 to 3, an imaging device 1 includes a main frame 2, a lens barrel 3 provided in the main frame 2, and a finder 4 (electronic viewfinder) that is detachable from the main frame 2.

The main frame 2 includes an optical system 21, a lens driver 22, a diaphragm 23, a diaphragm driver 24, a shutter 25, a shutter driver 26, an imaging unit 27, an imaging unit driver 28, a signal processor 29, a light emitter 30, a clock 31, an accessory communication unit 32, an input unit 33, a display unit 34, a touch panel 35, a recording unit 36, an operation unit 37, and a controller 38.

The optical system 21 is composed of a single lens or a plurality of lenses and collects light from a predetermined viewing area. The optical system 21 has an optical zoom function that changes an angle of view and a focus function that changes focus. The lens driver 22 is composed of, for example, a DC motor or a stepping motor and moves one or more lenses of the optical system 21 along an optical axis O to change a focus position, an angle of view, and the like. Details of the configuration of the optical system 21 are described later.

The diaphragm 23 adjusts an exposure by limiting an incidence amount of light collected by the optical system 21. The diaphragm driver 24 is composed of, for example, a stepping motor and drives the diaphragm 23.

The shutter 25 sets a state of the imaging unit 27 to an exposure state or a light blocking state. The shutter driver 26 is composed of, for example, a stepping motor and drives the shutter 23 in accordance with a release signal input from the controller 38.

The imaging unit 27 is composed of, for example, a CCD (Charge Coupled Device) or a CMOS (Complementary Metal Oxide Semiconductor) that receives and converts light collected by the optical system 21 into an electrical signal. The imaging unit driver 28 outputs image data (analog signal) from the imaging unit 27 to the signal processor 29 at a predetermined timing based on control of the controller 38. In this respect, the imaging unit driver 28 functions as an electronic shutter.

The signal processor 29 performs image processing such as amplification on the image data output from the imaging unit 27 and performs A/D conversion to generate digital image data, and then outputs the digital image data to the controller 38. Specifically, the signal processor 29 performs noise reduction processing, gain-up processing, and the like on the analog signal. For example, the signal processor 29 reduces reset noise of the analog signal and the like and performs waveform shaping, and then performs gain-up to achieve target lightness.

The light emitter 30 is composed of, for example, a xenon lamp or an LED (Light Emitting Diode). The light emitter 30 radiates strobe light of auxiliary light toward the viewing area of the imaging device 1.

The clock 31 has a clock function and a decision function of shooting date. The clock 31 outputs date data to the controller 38 in order to add the date data to the image data captured by the imaging unit 27.

The accessory communication unit 32 is a communication interface that performs communication with the finder 4 attached to the main frame 2. In addition to the finder 4, the accessory communication unit 32 is capable of communicating bidirectionally with other accessories such as an electronic flush, a GPS receiver, and a microphone.

As shown in FIGS. 1 and 2, the input unit 33 includes a power supply switch 33a that switches a power state of the imaging device 1 to an ON state or an OFF state; a release switch 33b that inputs a release signal for instructing to capture a still image; a mode switch 33c that inputs a switch signal to the imaging device 1 for instructing to switch various shooting modes; and a moving image switch 33d that inputs a moving image release signal for instructing to capture moving images. The release switch 33b is capable of moving forward/backward by a pressing force from an outside. When the release switch 33b is halfway pressed, a first release signal is input that instructs a shooting preparation operation, and when the release switch 33b is fully pressed, a second release signal is input that instructs to capture a still image.

The display unit 34 is realized by a display panel including, for example, liquid crystals or organic ELs (Electro Luminescence). The display unit 34 displays an image corresponding to image data. The display unit 34 also displays operation information of the imaging device 1 and shooting information. Here image display includes, for example, rec view display in which image data immediately after being taken is displayed for a predetermined period of time (for example, for three seconds), playback display in which image data recorded on the recording unit 36 is displayed, live view image display in which live view images corresponding to image data successively generated by the imaging unit 27 are displayed in a time series.

The touch panel 35 is provided on a display screen of the display unit 34. The touch panel 35 detects touch of an object from an outside and outputs a position signal corresponding to the detected touched position. In addition, the touch panel 35 may detect the position that the user contacts (touches) based on information displayed on the display unit 34 and receive input of an instruction signal for instructing an operation of the imaging device 1 in response to this contact position. Generally, there are a resistive type, a capacitance type, and an optical type for a touch panel. With the present embodiment, all types are applicable to the touch panel.

The recording unit 36 is realized by a semiconductor memory provided inside the imaging device 1 in a fixed manner, such as a flash memory or a DRAM (Dynamic Random Access Memory). The recording unit 36 stores various kinds of programs used to operate the imaging device 1, programs for the first embodiment, and various kinds of data and parameters used during execution of the programs. The recording unit 36 stores the image data, information of the optical system 21 attachable to the main frame 2, correction information of the image data according to the optical system 21 and the like. The recording unit 36 may be a computer-readable recording medium attached from an outside, such as a memory card.

The operation unit 37 is provided to the lens barrel 3 and changes the various parameters of the imaging device 1. For example, the operation unit 37 changes optical zoom magnification, pinch positions of the optical system 21, and the like. The position detector 374 includes an operation ring 371, an actuator 372, an actuator driver 373, a position detector 374, and a rotation position detector 375.

As shown in FIG. 1, the operation ring 371 is provided on an outer periphery of the lens barrel 3. The operation ring 371 is rotatable about the optical axis O of the optical system 21 and capable of moving forward/backward along the direction of the optical axis O within a predetermined range. When the imaging device 1 is set in a manual focus shooting mode (hereinafter referred to as "MF shooting mode"), the operation ring 371 changes focus positions of the imaging device 1. The operation ring 371 is formed with a plurality of groove portions extending in the direction of the optical axis O.

The actuator 372 is provided to the lens barrel 3 and capable of moving forward/backward along a predetermined radial direction of the lens barrel 3 and presses an inner circumference of the operation ring 371 when the inner circumference of the operation ring other than the notches is positioned in at least the radial direction. Specifically, the actuator 372 presses the inner circumference of the operation ring 371 along the radial direction from the inner circumference of the operation ring 371 so as to generate frictional force when the operation ring 371 is rotated. A detailed configuration of the actuator 372 is described later.

The position detector 374 is composed of, for example, a photointerruptor and a continuity sensor and detects a position of the operation ring 371 in the direction of the optical axis O. Specifically, the position detector 374 detects the position of the operation ring 371 on the optical axis O and outputs a detection result to the controller 38.

The rotation position detector 375 is composed of an encoder and a photointerruptor, and detects a rotation direction and amount of the operation ring 371 about the optical axis O. Specifically, the rotation position detector 375 detects passage of a plurality of light shielding members provided on the operation ring 371 in a circumferential direction at predetermined intervals using the photointerruptor and detects the rotation direction and amount of the operation ring 371 based on an output signal of the photointerruptor. The rotation position detector 375 may be configured using a potentiometer. The rotation position detector 375 may detect the rotation direction and amount of the operation ring 371, respectively, using two encoders.

The controller 38 is composed of, for example, a CPU (Central Processing Unit). In response to an instruction signal input from the input unit 33 or a detection signal input from the operation unit 37, the controller 38 performs overall control of the operation of the imaging device 1 in a manner that a control signal sends various data to each of the units that constitute the imaging device 1. The controller 38 also functions as an area change unit and a post-processor.

A configuration of the controller 38 is described in detail below. The controller 38 includes an image processor 381, a face detector 382, a tracked subject setting unit 383, a sub image generator 384, a parameter change unit 385, an imaging controller 386, a display controller 387, and a recording controller 388.

The image processor 381 is composed of an image engine (image controller) and applies various image processing to the image data input from the signal processor 29. Specifically, the image processor 381 performs image processing including at least gain processing for adjusting brightness of the image, gradation correction processing for correcting gradation, edge enhancement, white balance processing, color correction, and γ correction. The image processor 381 compresses the image data in accordance with JPEG (Joint Photographic Experts Group), Motion JPEG, MP 4 (H.264), and the like.

The face detector 382 performs pattern matching to detect a face of a person that is contained in the image corresponding to the image data. The face detector 382 may detect a face of a dog, cat and the like as well as that of a person. The face detector 382 may detect the face of a person by any other existing technique other than pattern matching.

The tracked subject setting unit 383 sets a face detected by the face detector 382 as a subject to be tracked in the main image as time elapses. Specifically, based on changes of image information of areas partially including the face detected by the face detector 382 in the plurality of the main images successively generated, the tracked subject setting unit 383 sets a moving subject that moves in the main image as time elapses, as a subject to be tracked. Here the image information includes, for example, edge information, color information, luminance information, density information, and the like. The tracked subject setting unit 383 applies a predetermined processing, such as edge detection processing and binarization processing, to the plurality of the main images successively generated and sets the moving subject that moves in the main image as time elapses, as a subject to be tracked.

The sub image generator 384 cuts a predetermined area from the main image corresponding to the image data generated by the imaging unit 27 to generate a sub image. Specifically, the sub image generator 384 performs trimming and cuts out an area that contains the face of the person detected by the face detector 382, from the main image, to generate the sub image data. Alternatively, the sub image generator 384 may be configured with other image engine that is different from that of the image processor 381 and perform image processing on a single set of image data (a frame) output from the imaging unit 27, including image processing normally performed by the image processor 381 and trimming, to generate the sub image data having a different viewing area from the main image.

The parameter change unit 385 changes a parameter of a cut area to be cut out from the main image by the sub image generator 384 in accordance with an operation of the operation unit 37. Specifically, the parameter change unit 385 changes one of an angle of view of the optical system 21 (zoom ratio), a size of the cut area to be cut out from the main image by the sub image generator 384, or a position of the cut area in the main image, as a parameter of the cut area in accordance with the operation of the operation unit 37.

When a second release signal is input via the release switch 33b, the imaging controller 386 performs control to start a shooting operation of the imaging device 1. Here the shooting operation of the imaging device 1 is an operation in which the signal processor 29 and the image processor 381 apply a predetermined processing on the image data output from the imaging device 27 by driving the shutter driver 26 and the imaging unit driver 28. The image data after being processed in such a manner is recorded on the recording unit 36 by the imaging controller 386.

The display controller 387 displays the image corresponding to the image data, on the display unit 34 and/or a finder display unit 42. Specifically, in the case the finder display unit 42 is in a state in which displaying is possible, for example, when a power is turned on, the display controller 387 displays a live view image corresponding to the image data, on the finder display unit 42. On the other hand, when the finder display unit 42 is turned off, the display controller 387 displays the live view image corresponding to the image data, on the display unit 34. Additionally, the display controller 387 displays the sub image generated by the sub image generator 384, on the finder display unit 42. Further, the display controller 387 superimposes the sub image information of the cut area to be cut out from the main image by the sub image generator 384 on the main image (live view image) displayed on the display unit 34.

The recording controller 388 records the image data successively generated by the imaging device 27 and sequentially applied a predetermined image processing on by the signal processor 29 and the image processor 381, and the sub image data sequentially cut out by the sub image generator 384 from the predetermined area in the main image corresponding to the image data, on the recording unit 36 in an order in which the image data is generated.

The main frame 2 having the above described configuration may have a communication function that enables bidirectional communication with a personal computer (not shown) via the Internet.

The finder 4 displays a display screen that can be viewed when a user moves his eyes closer to. The finder 4 displays a live view image corresponding to the image data generated by the imaging unit 27. The imaging unit 27 includes a finder communication unit 41 and a finder display unit 42.

The finder communication unit 41 is an interface for communicating with the accessory communication unit 32 of the main frame 2 when the finder 4 is attached to the main frame 2.

The finder display unit 42 is realized by a display panel composed of, for example, liquid crystals or organic ELs. The finder display unit 42 displays the live view image corresponding to the image data. The finder display unit 42 superimposes operation information of the imaging device 1 or photography information related to a photography circumstance, upon the live view image. If the user moves his eyes closer to the finder display unit 42, the live view image can be viewed. Based on control of the display controller 384, the finder display unit 42 displays the sub image corresponding to the sub image data successively generated by the sub image generator 384.

Figure 4:
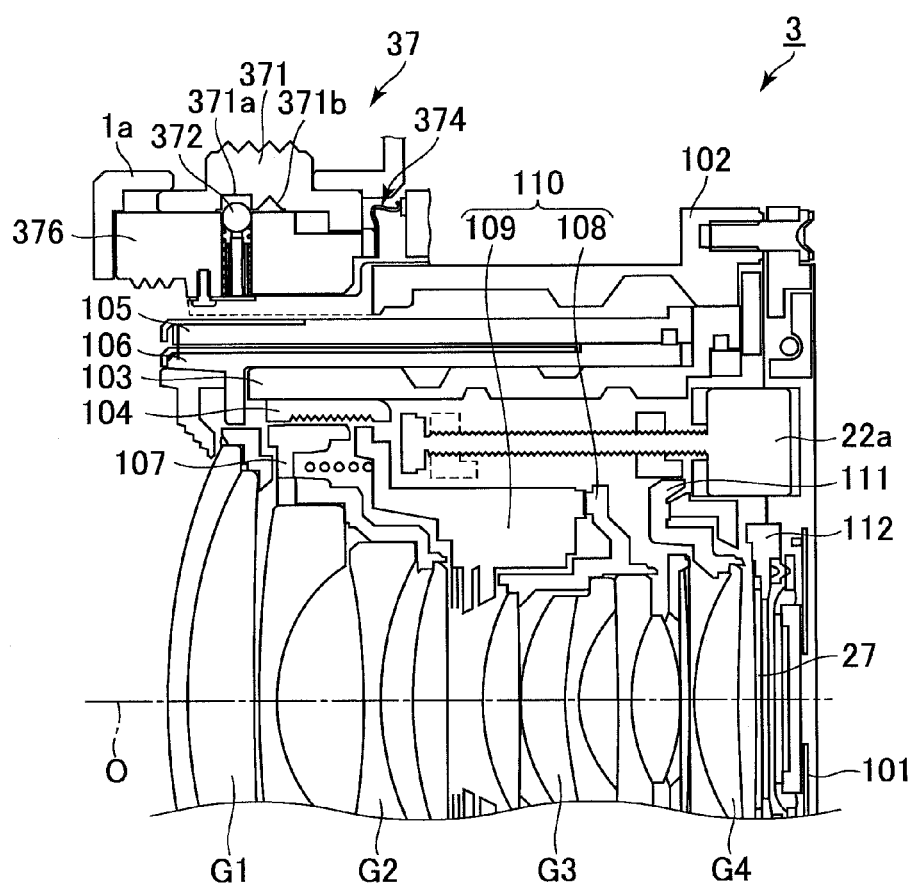
FIG. 4 is a sectional diagram illustrating a configuration of a principal part of a lens barrel shown in FIG. 1 in a retracted state.
Figure 5:
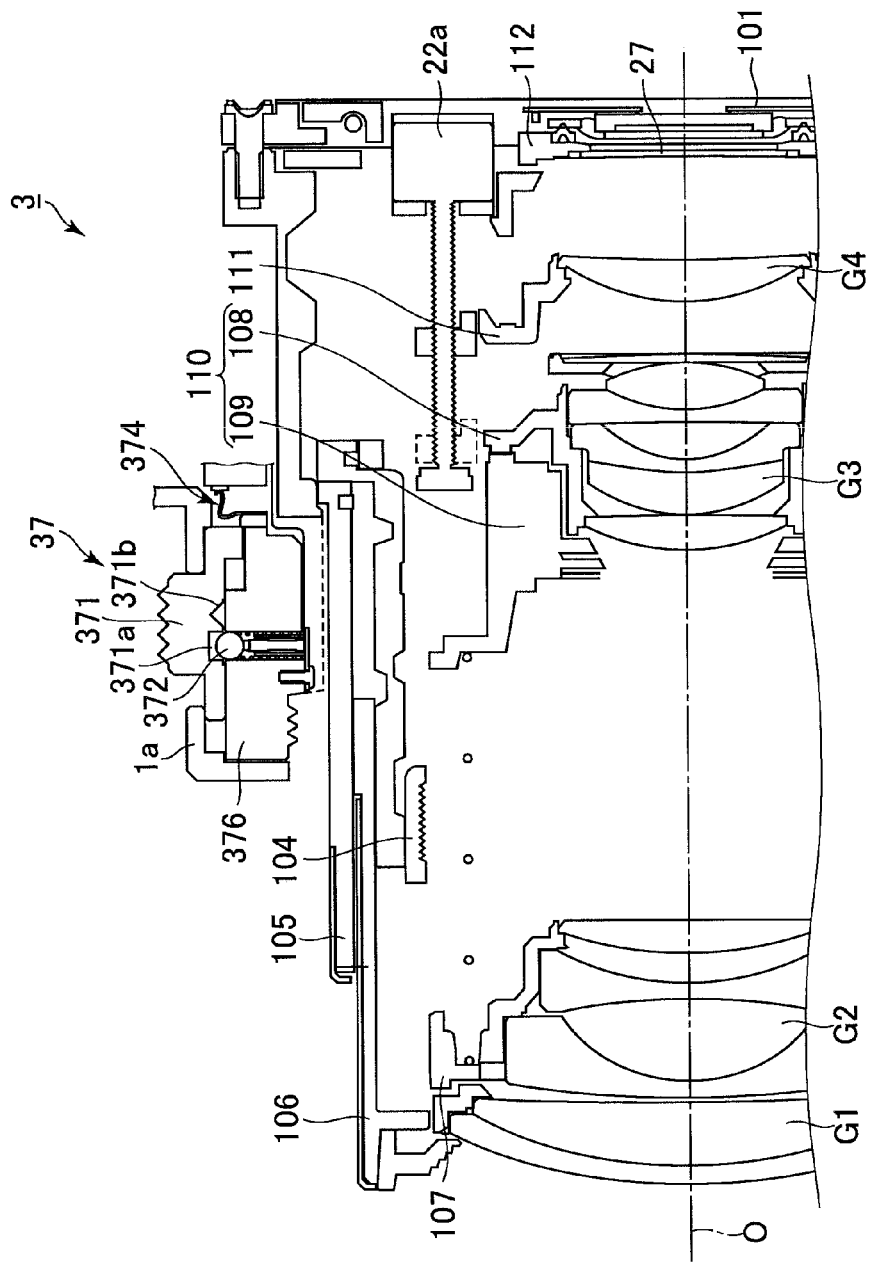
FIG. 5 is a sectional diagram illustrating a configuration of a principal part of the lens barrel shown in FIG. 1 in an extended state.

The lens barrel 3 built in the imaging device 1 having the above described optical system and the like is described in detail below. FIG. 4 is a sectional diagram illustrating a configuration of a principal part of the lens barrel 3 in a retracted state. FIG. 5 is a sectional diagram illustrating a configuration of a principal part of the lens barrel 3 in an extended state. In FIGS. 4 and 5, the front is on the left side, and the rear is on the right side.

As shown in FIGS. 4 and 5, the lens barrel 3 includes a fixed frame 102 that is fixed to a base member of a sensor unit 101 holding the imaging unit 27; a cam frame 103 that is supported by the fixed frame 102, driven to be rotated and moved forward/backward along the direction of the optical axis O during the zooming or retracting operation; a float key 104 that moves forward/backward along the direction of the optical axis O with the cam frame 103 with rotation being restricted; a guide frame 105 that moves forward/backward along the direction of the optical axis O with the cam frame 103 with rotation being restricted; a first group frame 106 that holds a first lens group G1 of the optical system 21 to be moved forward/backward along the direction of the optical axis O by rotation of the cam frame 103 with rotation being restricted; a second group frame 107 that holds a second lens group G2 to be moved forward/backward along the direction of the optical axis O by rotation of the cam frame 103 with rotation being restricted; a third group frame 108 that holds a third lens group G3 to be moved forward/backward along the direction of the optical axis O by rotation of the cam frame 103 with rotation being restricted; a shutter frame 109 that holds a shutter 25, a third group unit 110 that supports a shutter frame 109 and holds a third group frame 108; a fourth group frame 111 that holds a fourth lens group (focusing lens) G4 connected to the fixed frame 102 to be moved forward/backward along the direction of the optical axis O; a sensor unit frame 112 that holds the imaging unit 27; and an operation ring 371 that is rotatable against the fixed frame 102. The optical system 21 includes the first group lens G1, the second group lens G2, the third group lens G3, and the fourth group lens G4.

The fixed frame 102 is formed in a cylindrical shape and provided with a zoom drive unit (not shown) on an outer periphery for a zooming operation of the optical system 21 and a focus drive unit 22a on an inner periphery for a focusing operation of the optical system 21, respectively. The zoom drive unit performs a zooming operation for driving a zooming optical system (first group lens G1, second group lens G2, and third group lens G3) of the optical system 21 contributing to the zooming operation along the direction of the optical axis O and a retracting operation for driving the lens barrel 3 from a ready-to-photograph state to a retracted state. The focus drive unit 22a performs a focusing operation for driving a focusing optical system (fourth group lens G4) of the optical system 21 contributing to the focusing operation along the direction of the optical axis O.

The cam frame 103 is formed in a cylindrical shape and fitted into an inner periphery of the fixed frame 102 so as to be rotatable and moved forward/backward. While being rotated by the zoom drive unit, the cam frame 103 is extended forward from the retracted state (rear movement end: See FIG. 4) to a wide end, or a short focus position, in the ready-to-photograph state (front movement end: See FIG. 5). In the ready-to-photograph state of the lens barrel 3, during the zooming operation between the wide end (short focus position) and a tele end (long focus position), the cam frame 103 is only allowed to rotate at the front movement end while the movement in the direction along the optical axis O is restricted.

The float key 104 is formed in a cylindrical shape and fitted into an inner periphery of the cam frame 103 so as to be rotatable in a relative manner. The float key 104 moves in the direction along the optical axis O with the cam frame 103, while rotation is restricted by the fixed frame 102. Further, the float key 104 supports the second group frame 107 and the third group unit 110 at an inner peripheral part so that they can move forward/backward, and restricts their rotation.

The guide frame 105 is formed in a cylindrical shape. On an inner periphery at a rear end, the guide frame 105 has a bayonet lug (not shown) that is fitted into an engaging groove (not shown) of the cam frame 103. The guide frame 105 supports the first frame 106 at an inner peripheral part so that the first frame 106 can move forward/backward along the direction of the optical axis O and restricts rotation of the first frame 106. Further, the guide frame 105 is fitted into an inner peripheral part of the fixed frame 102 and jointed to the fixed frame 102 in a bayonet joint manner. As same as the float key 104, the guide frame 105 moves in the direction along the optical axis O with the cam frame 103 while rotation is restricted by the fixed frame 102.

The first group frame 106 is formed in a cylindrical shape and fitted into between the cam frame 103 and the guide frame 105 and holds the first lens group G1. The first group frame 106 is driven to move forward/backward by rotation of the cam frame 103 while rotation is restricted by the guide frame 105.

The second group frame 107 is formed in a cylindrical shape and fitted into an inner periphery of the front key 104. The second group frame 107 holds the second lens group G2 at a nearly center of the inner periphery and driven to move forward/backward in the direction along the optical axis O by rotation of the cam frame 103 while rotation being restricted by the front key 104. When the cam frame 103 is positioned at the rear movement end, the second group frame 107 is fitted into the inner periphery side of the shutter frame 109.

The third group frame 108 is formed in a cylindrical shape and has a holding frame (not shown) that holds the third group lens G3. The third group frame 108 is fixed to the shutter frame 109 in a manner such that the holding frame is fitted into the shutter frame 109. The third group frame 108 is fitted into inside of the front key 104. The third group frame 108 is driven to move forward/backward by the cam frame 103 while rotation is restricted by the front key 104.

The shutter frame 109 is formed in a cylindrical shape and holds a shutter blade of the shutter 25, a shutter driver 26 including an actuator that drives the shutter blade to be rotated and the like.

The third group unit 110 holds the third group frame 108 and the shutter frame 109 at a front side of the third group frame 108. A coil spring (not shown) is disposed between the third group unit 110 and the second group unit 107. Accordingly, the second group unit 107 and the third group unit 110 are biased in a direction in which they are separated from each other.

The fourth group frame 111 is formed in a cylindrical shape. The fourth group frame 111 holds the fourth group lens G4 and is supported so that it can be moved forward/backward by the focus drive unit 22a in the direction along the optical axis O inside the fixing frame 102. Accordingly, when the lens barrel 3 is in the ready-to-photograph state, the fourth group frame 111 is adjusted to a proper focusing position. On the other hand, when the lens barrel 3 is in the retracted state, the fourth group frame 111 is positioned at a predetermined retracting position.

The operation unit 37 is fitted into the fixing frame 102 so that the operation ring 371 can be rotated. If the operation ring 371 is rotated by the user about the optical axis O, the operation unit 37 receives input to change various control parameters of the imaging device 1.

Figure 6:
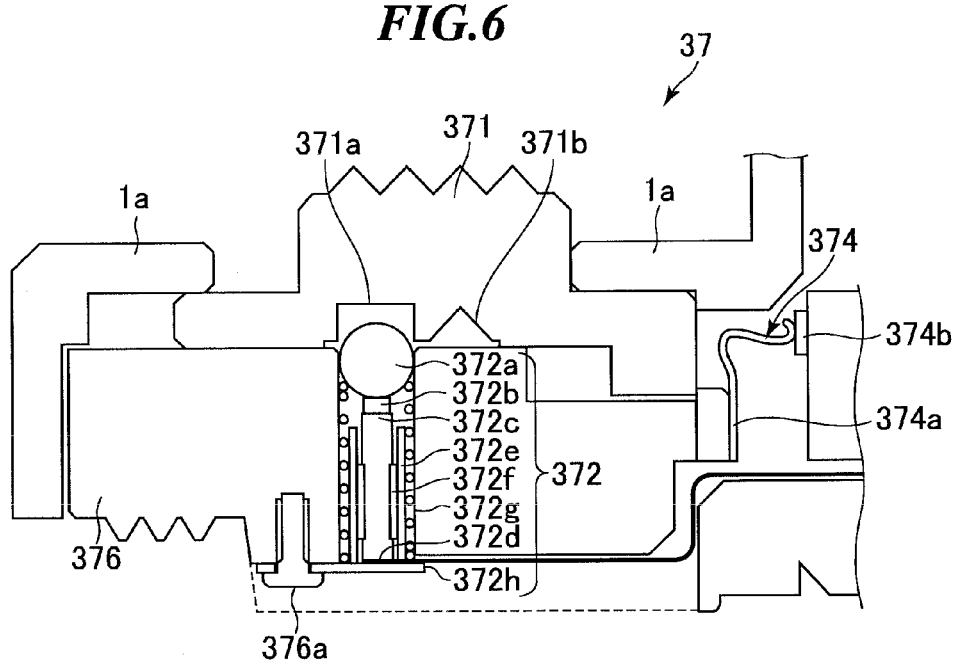
FIG. 6 is an enlarged sectional diagram of a principal part of an operation unit shown in FIG. 4.
Figure 7:
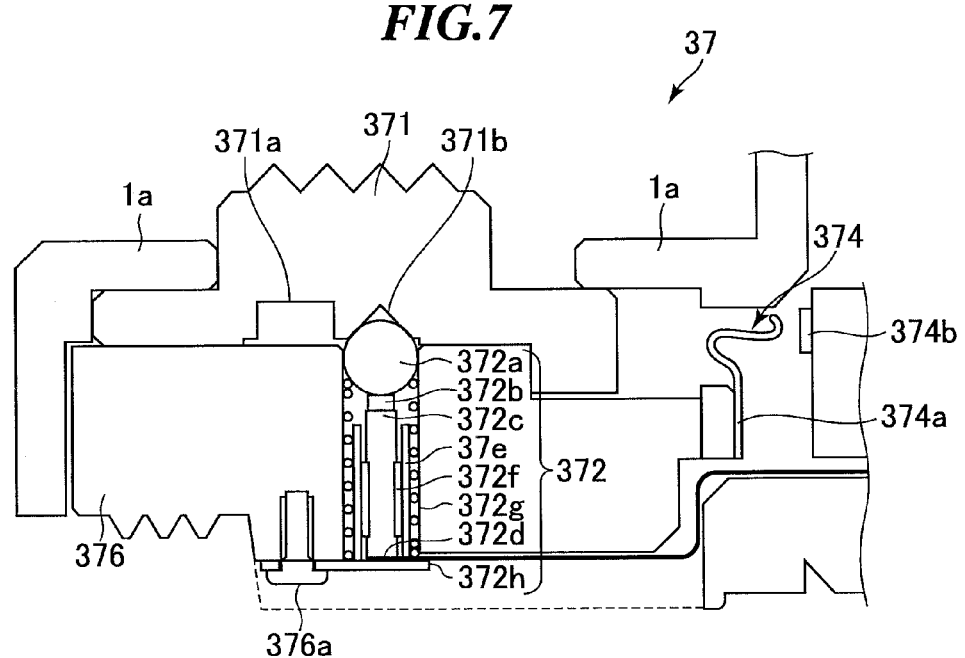
FIG. 7 is an enlarged sectional diagram of the principal part of the operation unit shown in FIG. 4 when the operation unit has been moved in a direction along an optical axis.
Figure 8:
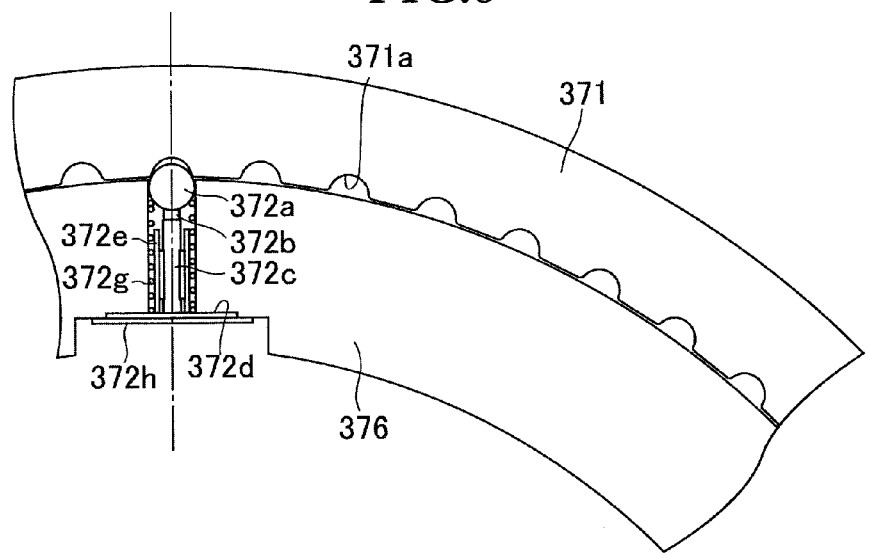
FIG. 8 is a sectional diagram of a principal part of the operation unit from the optical axis direction.
Figure 9:
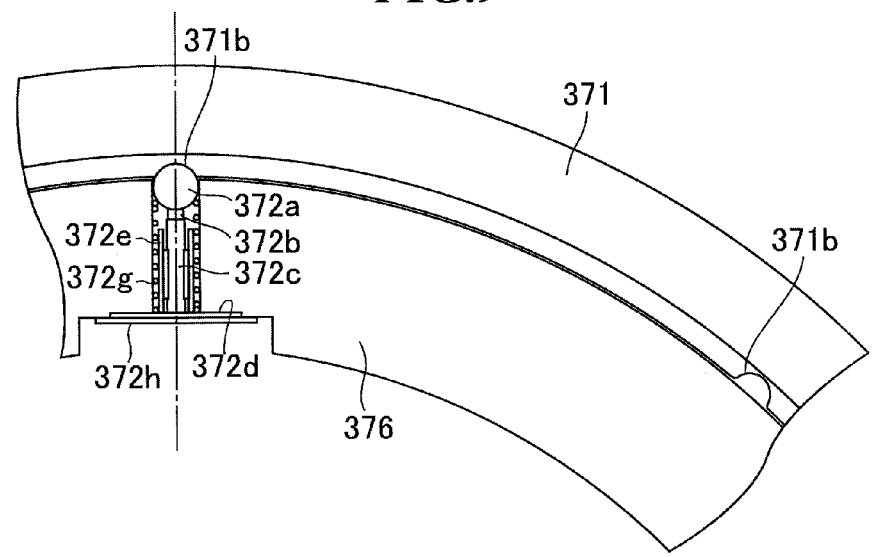
FIG. 9 is another sectional diagram of the principal part of the operation unit from the optical axis direction.
Figure 10:
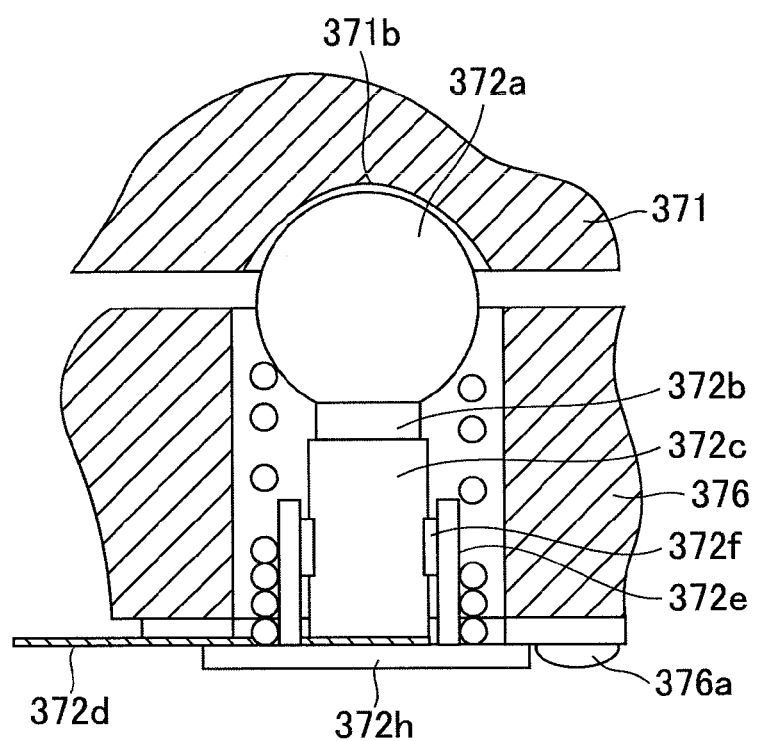
FIG. 10 is an enlarged sectional diagram of the principal part of the operation unit.
Figure 11A:
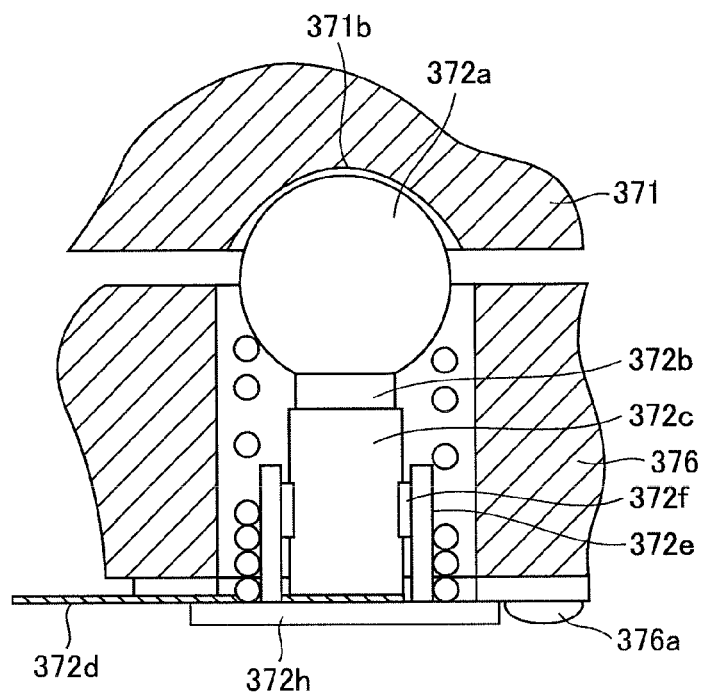
FIGS. 11A and 11B are sectional diagrams schematically illustrating changes of the operation unit.
Figure 11B:
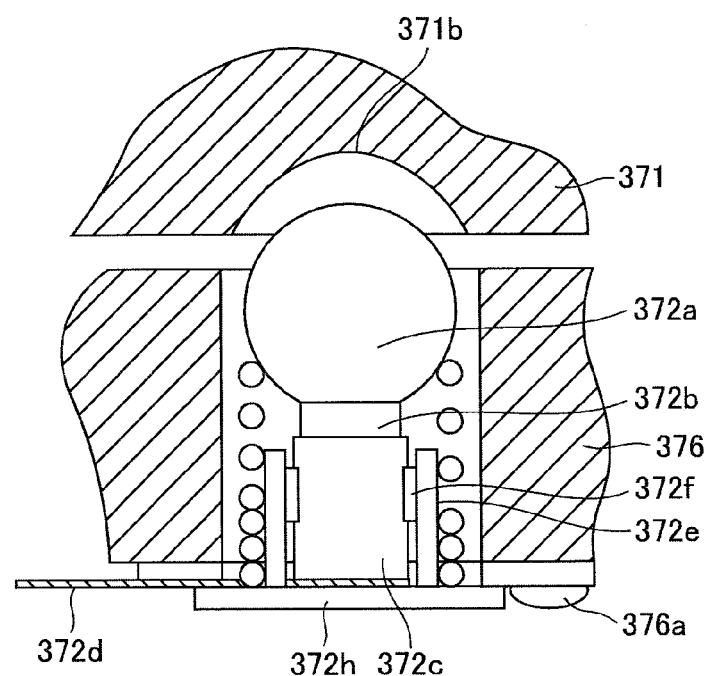

A configuration of the operation unit 37 is described in detail below. FIG. 6 is an enlarged sectional diagram of a principal part of the operation unit 37 shown in FIG. 4. FIG. 7 is an enlarged sectional diagram of a principal part of the operation unit shown in FIG. 4 when the operation unit has moved in the direction along the optical axis O. FIG. 8 is a sectional diagram of a principal part of the operation unit viewed from the direction of the optical axis O. FIG. 9 is another sectional diagram of a principal part of the operation unit viewed from the direction of the optical axis O. FIG. 10 is an enlarged sectional diagram of a principal part of the operation unit 37. FIG. 11 is a sectional diagram schematically illustrating change of the operation unit 37.

As shown in FIGS. 6 to 11, the operation unit 37 includes an operation frame 376 that is fitted into the fixing frame 102, the operation ring 371 that is rotatable against the operation frame 376, an actuator 372 that is biased from the inner peripheral side to a radial direction (outward) of the operation ring 371, an actuator driver 373 (not shown), a position detector 374 that detects a position of the operation ring 371, and a rotation position detector 375 (not shown).

The operation ring 371 is formed in a ring-shape and provided on the outer periphery of the lens barrel 3 being fitted into the operation frame 376 so as to be rotatable against the operation frame 376. The operation ring 371 is held by a housing 1a of the imaging device 1 so that the operation ring 371 can move forward/backward between the first and second positions along the direction of the optical axis O. The operation ring 371 includes a recess 371a and a notch 371b from front on an inner periphery. A plurality of the recesses 371a with a nearly C-shape cross section are formed along a periphery of the operation ring 371 at equal intervals (see FIG. 8). A plurality of the notches 371b with a nearly triangular-shape cross section are formed along the periphery of the operation ring 371 at equal intervals. A greater number of recesses 371a are formed on the operation ring 371 than the notches 371b. Further, the recesses 371a are more deeply formed than the notches 371b so that the recesses 371a can hold a ball 372a more strongly than the notches 371b.

The actuator 372 is provided inside the operation frame 376. The actuator 372 includes the ball 372a that can move forward/backward in the recess 371a or the notch 371b, a support member 372b that supports the ball 372a, a piezoelectric element 372c that presses an inner circumference of the operation ring 371 when the ball 372a is positioned at the inner circumference of the operation ring 371 other than the recess 371a and the notch 371b via the support member 372b, an FPC 372d as an actuator driver 373 that supplies driving voltage to the piezoelectric element 372c, a holding frame 372e that is formed in a cylindrical shape and holds the piezoelectric element 372c, a contact member 372f that attaches the piezoelectric element 372c to the holding frame 372e, a pressing spring 372g that biases the ball 372a to the operation ring 371, and a flat spring 372h that is fixed to the operation frame 376 by a screw 376a and supports the piezoelectric element 372c, the holding frame 372e, and the pressing spring 372g.

With respect to the actuator 372 having the above described configuration, when voltage is supplied to the piezoelectric element 372c via the FPC 372d, the ball 372a presses the operation ring 371. Specifically, as shown in FIG. 11(*a*), when voltage is supplied to the piezoelectric element 372c via the FPC 372d, the piezoelectric element 372c expands in the radial direction from the inner circumference of the operation ring 371 and then the ball 372a presses the notch 371b of the operation ring 371 (see FIG. 11 (a)). Accordingly, when the operation ring 371 is rotated by the user, the ball 372a comes into contact with the notch 371b. Then, a click sound is caused and the rotation direction and amount of the operation ring 371 can be understood by the user. On the other hand, when voltage is stopped to be supplied via the FPC 372d, the piezoelectric element 372c contracts to a center of the operation ring 371. Then, the ball 372a moves to the center side and is apart from the notch 371b regardless of a pressing force of the pressing spring 372g (FIGS. 11 (a) to (b)). As a result, even if the operation ring 371 is rotated by the user, the ball 372a hardly comes into contact with the notch 371b and the click sound can be avoided.

The position detector 374 detects a position of the operation ring 371 along the direction of the optical axis O and outputs a detection result to the controller 38. The position detector 374 includes a contact member 374a that is provided behind the operation ring 371 and a conduction member 374b that is electrically connected with the contact member 374a. When the contact member 374a comes into contact and is electrically connected with the conduct member 374b by movement forward/backward along the direction of the optical axis O, the position detector 374 detects that the ball 372a of the actuator 372 is engaged with the notch 371a.

With respect to the operation unit 37, as described above, when the operation ring 371 is operated, the ball 372a of the actuator 372 moves in the recesses 371a or notches 371b of the operation ring 371. With respect to the operation unit 37, when the ball 372a is positioned at one of the recess 371a (hereinafter, referred to as "first position") and then the operation ring 371 is rotated by the user, for example, the ball 372a moves to an adjacent recess 371a. When the ball 372a is positioned at one of the notch 371b (hereinafter referred to as "second position") and then the operation ring 371 is moved forward along the direction of the optical axis O by the user, the ball 372a moves from the notch 371b to the recess 371a (first position). Accordingly, the user switches the various settings of the imaging device 1 by rotating or moving the operation ring 371 of the operation unit 37 forward/backward in the direction of the optical axis O. The recess 371a is formed in such a way that frictional force is larger at the time of the movement to another adjacent recess 371a than at the time of the movement from the notch 371b to the recess 371a.

Figure 12A:
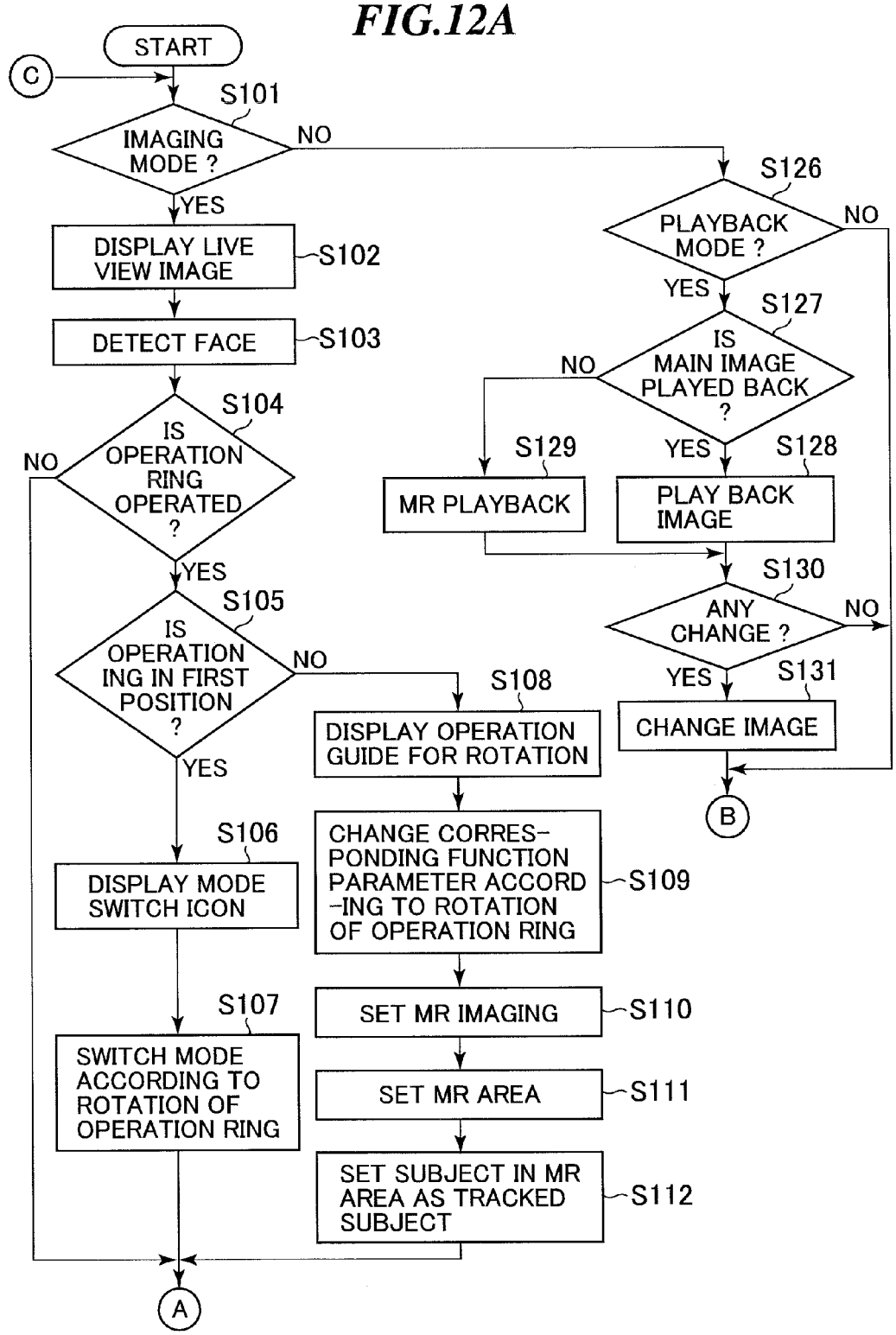
FIGS. 12A and 12B is a flowchart illustrating an outline of processing performed by the imaging device according to the first embodiment of the invention.
Figure 12B:
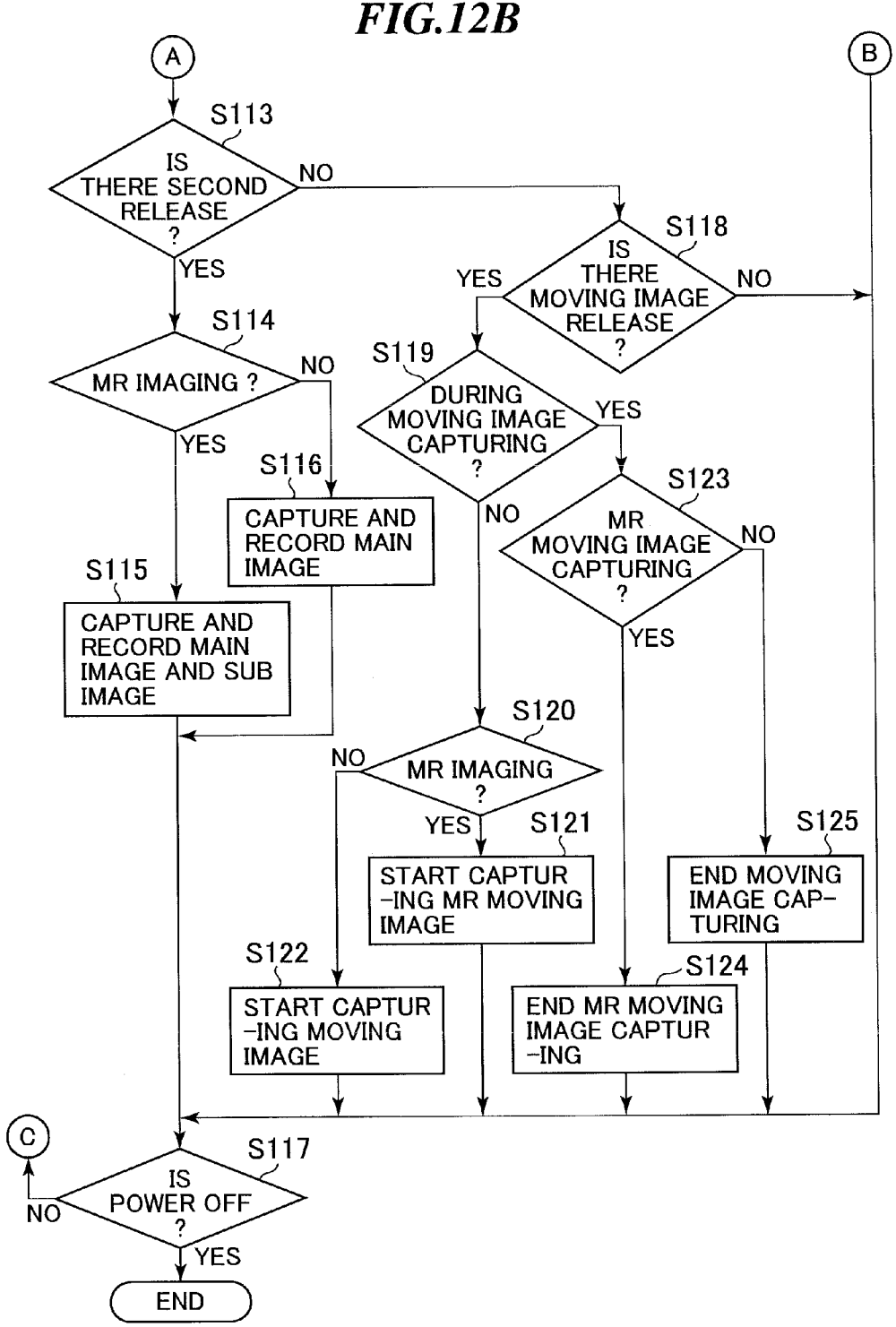

The processing performed by the imaging device 1 having the above described configuration is described below. FIG. 12 is a flowchart illustrating an outline of processing performed by the imaging device 1.

As shown in FIG. 12, when the imaging device 1 is set to a shooting mode (step S101: Yes), the 387 displays a live-view image (main image) corresponding to the image data generated by the imaging unit 27 on the display unit 34 (step S102).

Subsequently, the face detector 382 detects a subject's face displayed in the live-view image (step S103). Specifically, the face detector 382 detects the face of a subject K1 in a live-view image W1.

After that, the controller 38 determines whether or not the operation ring 371 has been operated (step S104). Specifically, based on a detection signal output from the position detector 374 that indicates that the operation ring 371 has been moved from the first position to the second position or another detection signal output from the rotation position detector 375 that indicates that the operation ring 371 has been rotated, the controller 38 determines whether or, not the operation ring 371 has been operated. When the controller 38 determines that the operation ring 371 has been operated (step S104: Yes), the imaging device 1 proceeds to step S105 (described later). On the other hand, when the controller 38 determines that the operation ring 371 has not been operated (step S104: No), the imaging device 1 proceeds to step S113 (described later).

Figure 13:
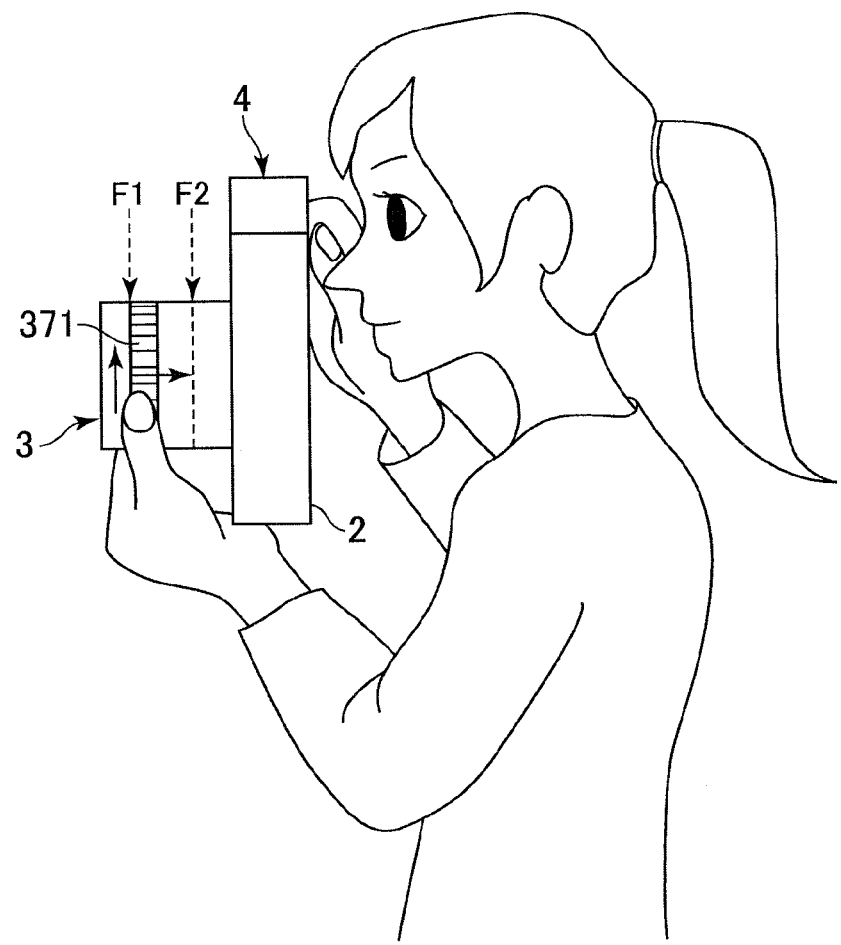
FIG. 13 is a schematic diagram illustrating a state in which a photographer uses the imaging device to take a photograph.

At step S105, the controller 38 determines whether or not the operation ring 371 is positioned in the first position. Specifically, as shown in FIGS. 6, 7 and 13, based on the detection result of the position detector 374, the controller 38 determines whether or not the operation ring 371 is positioned in a first position F1. When the controller 38 determines that the operation ring 371 is positioned in the first position F1 (step S105: Yes), the imaging device 1 proceeds to step S106 (described later). On the other hand, when the controller 38 determines that the operation ring 371 is not positioned in the first position F1 (step S105: No), the imaging device 1 proceeds to step S108 (described later).

Figure 14:
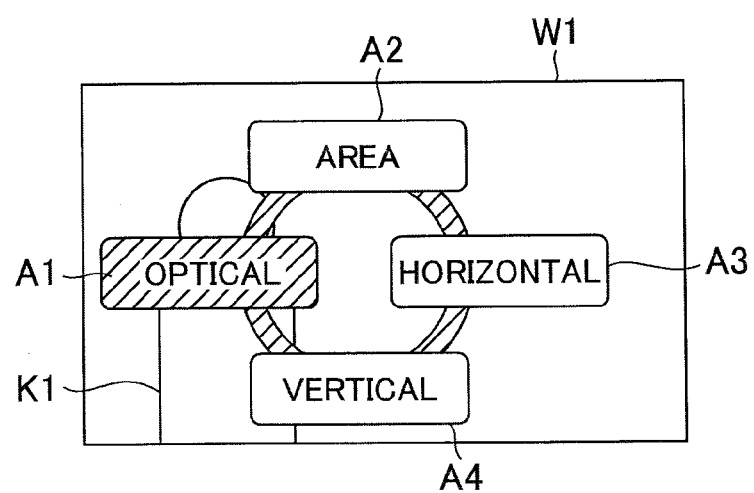
FIG. 14 is a view illustrating an example of an image displayed on a display unit.

At step S106, the display controller 387 superimposes a mode switch icon on the live-view image. Specifically, as shown in FIG. 14, the display controller 387 superimposes mode switch icons A1 to A4 on the live-view image W1 displayed on the display unit 34. The icon A1 is an icon by which the imaging device 1 is set to a mode to change a parameter of optical zoom. The icon A2 is an icon by which the imaging device 1 is set to a mode to change a range of the cut area when the sub image generator 384 cuts out from the main image and generates a sub-image. The icon A3 is an icon by which the imaging device 1 is set to a mode to change a horizontal position of the cut area in the main image when the sub image generator 384 cuts out from the main image and generates a sub-image. The icon A4 is an icon by which the imaging device 1 is set to a mode to change a vertical position of the cut area in the main image when the sub image generator 384 cuts out from the main image and generates a sub-image. FIG. 14 shows a case in which, after turning on the imaging device 1, the operation ring 371 has been moved to the first position F1 by the user and the icon A1 is selected (highlighted) by default.

Moreover, FIG. 14 illustrates an example of a digital operation using the operation ring 371. A digital operation is an operation of discretely switching parameters of various modes. Examples of the digital operations include switching between the various modes described above and switching ON and OFF. The digital operations may also include changing an aperture value, a point of focus, an exposure position, a shutter speed, ISO sensitivity, a program shift, flash settings, and exposure correction, which are easy to use in a discrete manner. Further, the digital operations may be applied to changes in a special effect, an aspect ratio of an image, and a trimming range by magnification settings, which can be selected discretely. In addition, operations, such as frame-by-frame advance, playback or composition of selected images, and transmitting, can be used as the digital operations.

Subsequently, the controller 38 switches the mode to change the parameter of the cut area to be cut out from the main image by the sub image generator 384 in accordance with the rotation of the operation ring 371 (step S107). Meanwhile, the display controller 387 changes highlighting of the icons among A1 and A4 in accordance with the rotation of the operation ring 371. After that, the process of the imaging device 1 proceeds to step S113 (described later).

Figure 15:
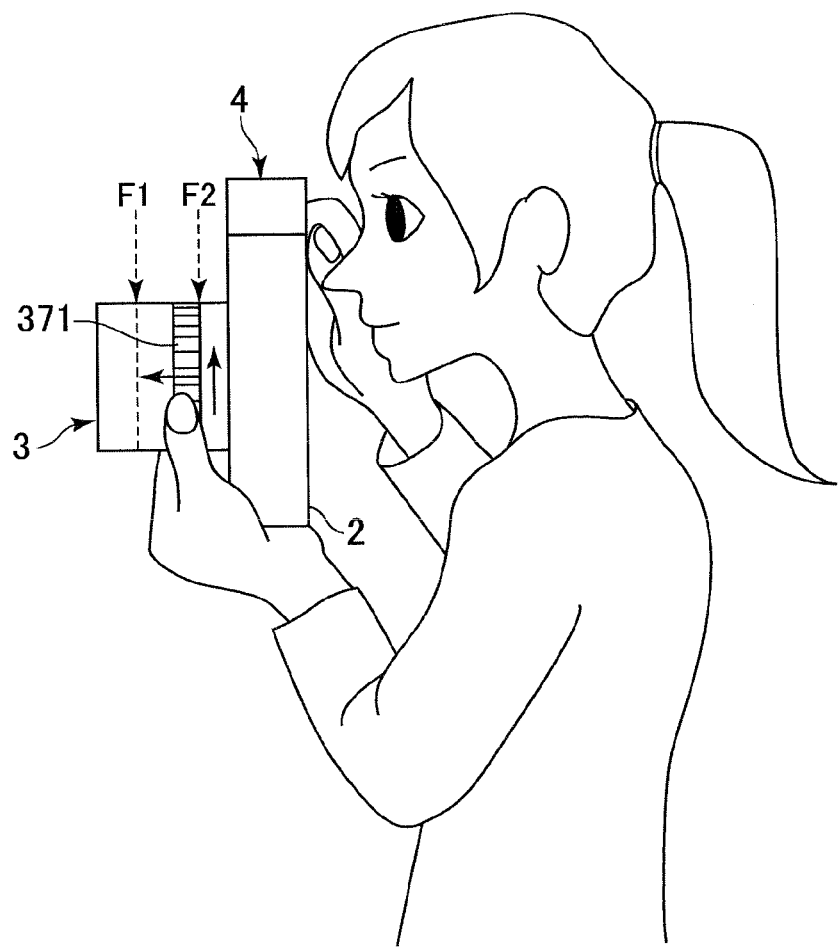
FIG. 15 is a schematic diagram illustrating another state in which a photographer uses the imaging device to take a photograph.

A case where the controller 38 determines at step S105 that the operation ring 371 is not positioned in the first position F1 (step S105: No) is described below. Specifically, as shown in FIG. 15, when the controller 38 determines that the operation ring 371 is positioned in a second position F2, the display controller 387 superimposes an operation guide for rotation on the live-view image on the display unit 34 according to the current mode to change the parameter of the imaging device 1 (step S108). For example, as shown in FIG. 16, the display controller 387 displays a bar B1 that indicates a current optical zoom ratio, mode information that indicates contents of the mode, and a zoom area Z1 of the angle of view estimated based on the rotation of the operation ring 371, on the live-view image W1 on the display unit 34.

Figure 16:
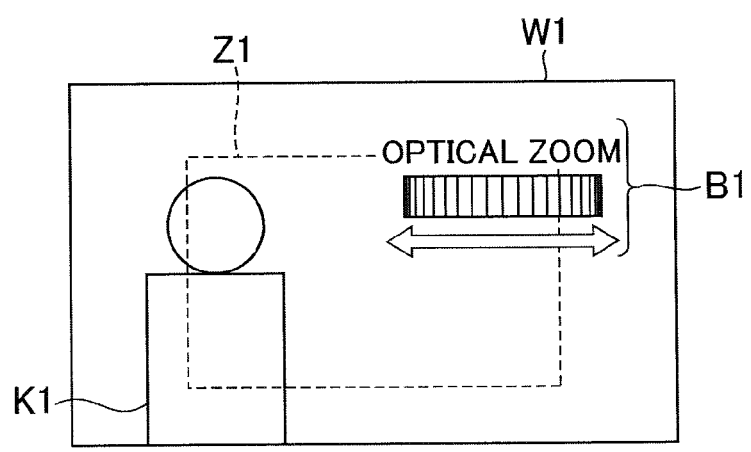
FIG. 16 is a view illustrating an example of an image displayed on the display unit according to an operation of the operation ring.

Moreover, FIG. 16 illustrates an example of an analog operation using the operation ring 371. An analog operation is an operation of continuously switching parameters of various modes. Examples of the analog operations include operations of changing a trimming position or the trimming range, and setting a zoom angle of view, which are described above. Further, the analog operations may be applied to changes in imaging parameters which can be changed continuously, such as switching of a point of focus, exposure, color correction, and contrast adjustment. With this analog operation, a user can perform fine adjustment. Further, as an analog operation, video playback speed can be changed when playing images.

Figure 17A:
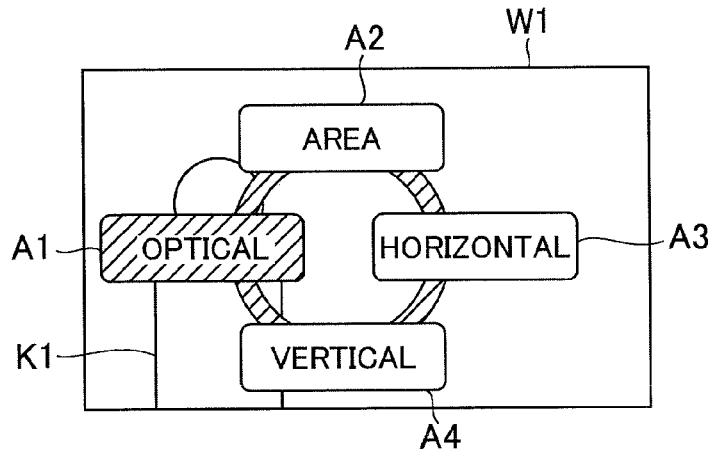
FIGS. 17A-17C are views illustrating an example of an image displayed on the display unit in accordance with an operation of the operation ring.
Figure 17B:
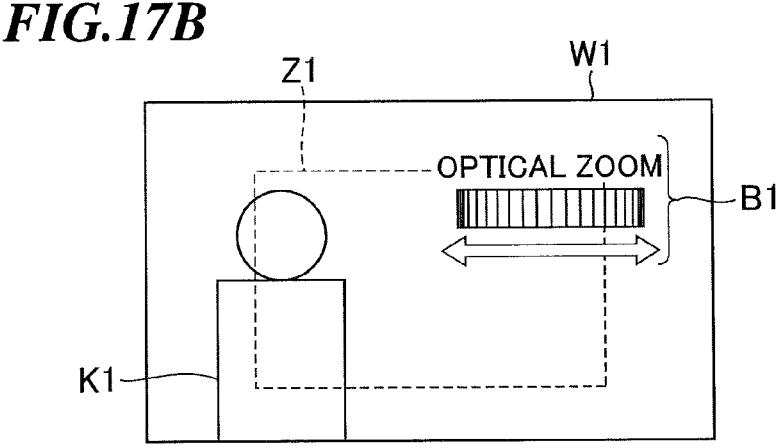
Figure 17C:
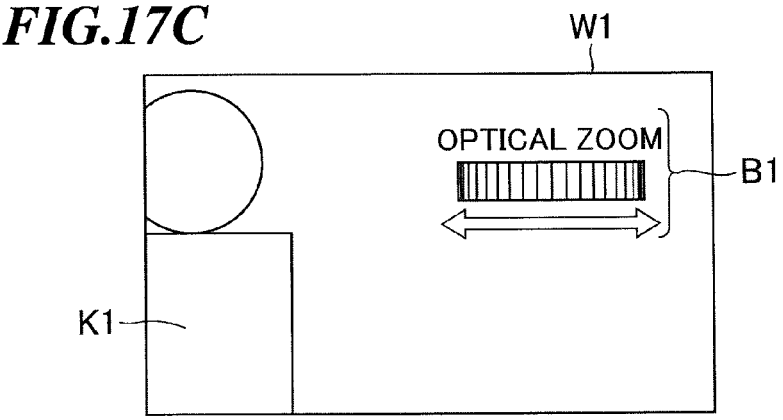

Subsequently, the parameter change unit 385 changes a corresponding function parameter in accordance with the rotation of the operation ring 371 (step S109). Specifically, as shown in FIG. 16, when the imaging device 1 is set to the mode to change the optical zoom, the parameter change unit 385 drives the lens driver 22 and moves the optical system 21 contributing to the optical zoom along the direction of the optical axis O in accordance with the rotation amount of the operation ring 371 and then changes the optical zoom ratio of the imaging device 1 (FIG. 17 (a)→FIG. 17 (b)→FIG. 17 (c)).

Figure 18A:
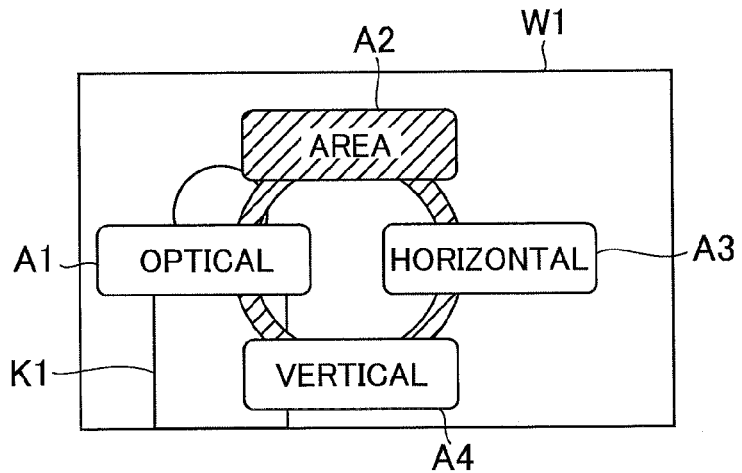
FIGS. 18A-18C are views illustrating an example of an image displayed on the display unit according to an operation of the operation ring.
Figure 18B:
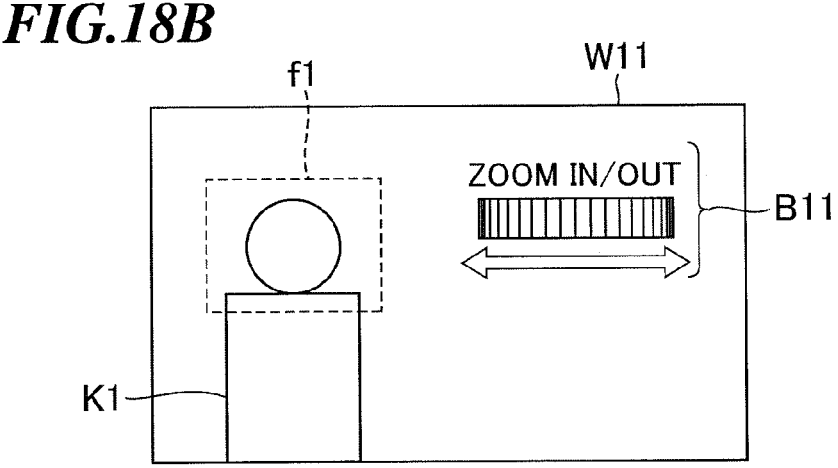
Figure 18C:
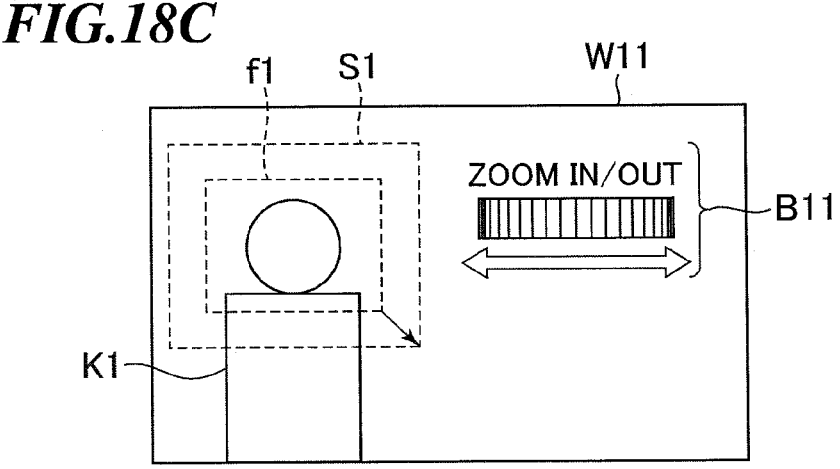

As shown in FIGS. 18(a)-18(c), when the imaging device 1 is set to the mode to change the range of the sub image (FIG. 18 (a)), the parameter change unit 385 enlarges or reduces an area f1 (FIG. 18 (b)) partially including the face detected by the face detector 382 by default, as an area to be cut out from the main image W11 by the sub image generator 384 in accordance with the rotation amount of the operation ring 371 (FIG. 18 (c)). As shown in FIG. 18 (c), the parameter change unit 385 enlarges the area f1 to an area S1 as an area to be cut out from the main image W11 by the sub image generator 384, in accordance with the rotation of the operation ring 371.

Figure 19A:
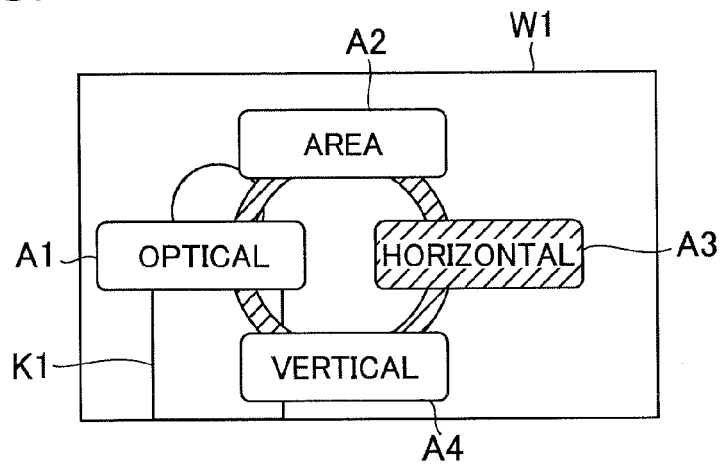
FIGS. 19A-19C are views illustrating an example of an image displayed on the display unit in accordance with an operation of the operation ring.
Figure 19B:
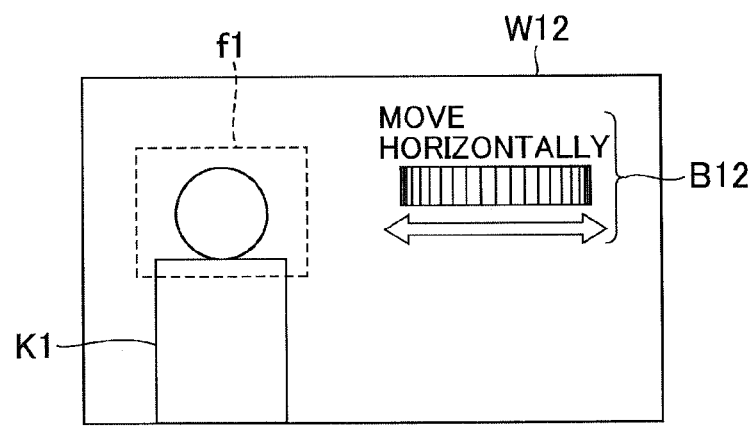
Figure 19C:
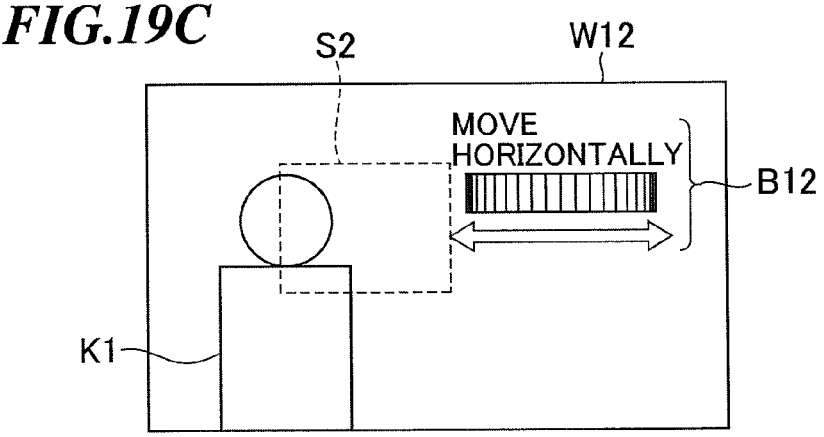

Further, as shown in FIGS. 19(a)-19(c), when the imaging device 1 is set to the mode to change the horizontal position of the sub image (FIG. 19 (a)) and the operation ring 371 is rotated, the parameter change unit 385 moves an area f1 (FIG. 19 (b)) partially including the face detected by the face detector 382 by default in a horizontal direction to change the area to be cut out from a main image W12 by the sub image generator 384 in accordance with the rotation amount of the operation ring 371 (FIG. 19 (c)). As shown in FIG. 19 (c), the parameter change unit 385 changes the area to be cut out from the main image W12 by the sub image generator 384, from the default area f1 to a right area S2, in accordance with the rotation of the operation ring 371.

Figure 20A:
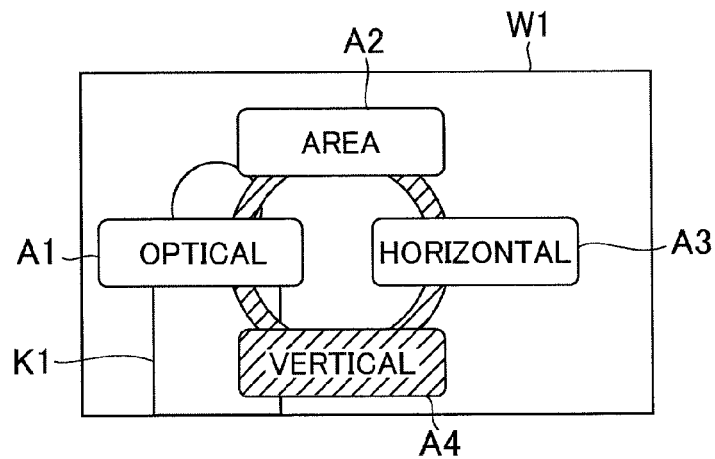
FIGS. 20A-20C are views illustrating an example of an image displayed on the display unit in accordance with an operation of the operation ring.
Figure 20B:
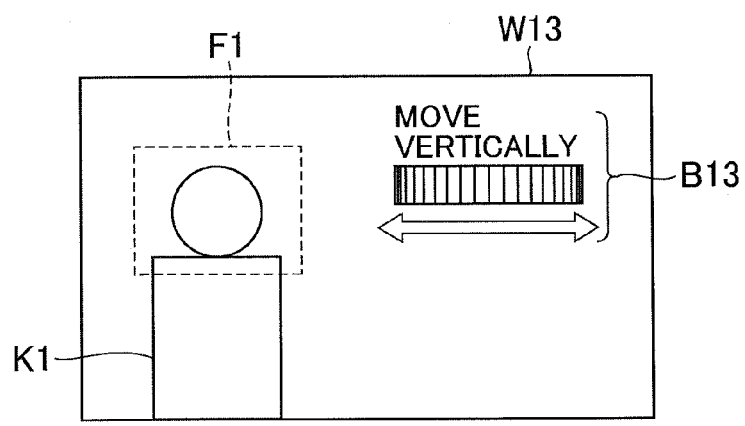
Figure 20C:
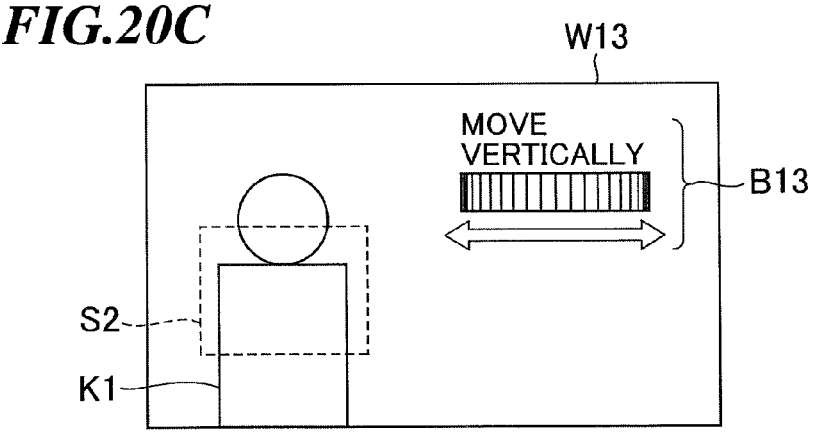

Further, as shown in FIGS. 20(a)-20(c), when the imaging device 1 is set to the mode to change the vertical position of the sub image (FIG. 20 (a)) and the operation ring 371 is rotated, the parameter change unit 385 moves an area f1 (FIG. 20 (b)) partially including the face detected by the face detector 382 by default in a vertical direction to change the area to be cut out from a main image W13 by the sub image generator 384 in accordance with the rotation amount of the operation ring 371 (FIG. 20 (c)). As shown in FIG. 20 (c), the parameter change unit 385 changes the area to be cut out from the main image W13 by the sub image generator 384 from the default area f1 to a downward area S2, in accordance with the rotation of the operation ring 371.

Referring back to FIG. 12, steps after S110 are described below. At step S110, the imaging controller 386 sets the imaging device 1 to MR (Multi-Recording) imaging. Specifically, the imaging controller 386 sets the imaging device 1 to the MR imaging by which the sub image data generated by the sub image generator 384 and image data generated by the imaging unit 27 in a set aspect ratio (main image data) are simultaneously recorded. In this case, the imaging controller 386 sets a flag indicating that the MR imaging is performed in the recording unit 36.

Subsequently, the imaging controller 386 sets the cut area of the sub image generator 384 that has been changed and set by the parameter, change unit 385 as an MR area (step S111).

After that, the tracked subject setting unit 383 sets a subject in the MR area as a subject to be tracked (step S112). Specifically, based on changes of image information of the MR areas included in the plurality of the main images successively generated, the tracked subject setting unit 383 sets the moving subject that moves in the screen as time elapses as a subject to be tracked. The tracked subject setting unit 383 applies predetermined processing to the plurality of the main images successively generated, such as edge detection and binarization, and then sets the moving subject that moves in the MR area as time elapses as a subject to be tracked. Accordingly, when the subject moves, the tracked subject setting unit 383 tracks and changes the MR area in accordance with movement of the subject.

Subsequently, when a second release signal has been input via the release switch 33b (step S113: Yes) and the imaging device 1 has been set to the MR imaging (step S114: Yes), the imaging device 1 captures the main image and the sub image based on control by the image controller 386 and then records the captured main image and sub image on the recording unit 36 (step S115).

On the other hand, when the second release signal has been input via the release switch 33b (step S113: Yes) and the imaging device 1 has not been set to the MR imaging (step S114: No), the imaging device 1 captures the main image based on control by the image controller 386 and then records the captured main image on the recording unit 36 (step S116).

After that, when the power supply switch 33a has been operated to turn off the imaging device 1 (step S117: Yes), the imaging device 1 terminates the processing. On the other hand, when the imaging device 1 has not been turned off via the power supply switch 33a (step S117: No), the process of the imaging device 1 returns to step S101.

A case is described in which the second release signal has not been input via the release switch 33b at step S113 (step S113: No). In this case, when the moving image switch 33d has been operated to input a moving image release signal (step S118: Yes), the process of the imaging device 1 proceeds to step S119. On the other hand, when the moving image release signal has not been input via the moving image switch 33d (step S118: No), the process of the imaging device 1 proceeds to step S117.

When the imaging device 1 is not capturing moving images at step S119 (step S119: No) and is set to the MR imaging (step S120: Yes), the imaging device 1 starts MR moving image capturing by which the main image data successively generated by the imaging unit 27 and the sub image data successively generated by the sub image generator 384 are sequentially recorded on the recording unit 36, based on control by the imaging controller 386 (step S121). After that, the process of the imaging device 1 proceeds to step S117.

When the imaging device 1 is not capturing moving images at step S119 (step S119: No) and has not been set to the MR imaging (step S120: No), the imaging device 1 starts capturing moving images by which the main image data successively generated by the imaging unit 27 is sequentially recorded based on control by the imaging controller 386 (step S122). After that, the process of the imaging device 1 proceeds to step S117.

When the imaging device 1 is capturing moving images at step S119 (step S119: Yes) and performing the MR imaging (step S123: Yes), the imaging device 1 ends the MR moving image capturing based on control by the imaging controller 386 (step S124). After that, the process of the imaging device 1 proceeds to step S117.

When the imaging device 1 is capturing moving images at step S119 (step S119: Yes) and not performing the MR imaging (step S123: No), the imaging device 1 ends the moving image capturing based on control by the imaging controller 386 (step S125). After that, the process of the imaging device 1 proceeds to step S117.

In the case that the imaging device 1 is not set to the imaging mode at step S101 (step S101: No) and is set to the playback mode (step S126: Yes), when only the main image is played back (step S127: Yes), the display controller 387 displays the main image corresponding to the normal main image data on the display unit 34 (step S128).

On the other hand, when the main image is not the only image to be played back (step S127: No), the display controller 387 displays the main image corresponding to the main image data and the sub image corresponding to the sub image data on the display unit 34 (step S129). In this case, the display controller 387 displays the main image and the sub image side-by-side or superimposes the sub image on the main image on the display unit 34. Alternatively, the display controller 387 may alternately display the main image and the sub image at predetermined time intervals. Alternatively, the display controller 387 may display both main image and sub image in separate display areas on the display unit 34.

After step S128 or S129, when the played back image is changed (step S130: Yes), the display controller 387 changes the images to be played back (step S131). After that, the process of the imaging device 1 proceeds to step S117. On the other hand, when the played back image is not changed (step S130: No), the process of the imaging device 1 proceeds to step S117.

With the first embodiment of the invention described above, the parameter, change unit 371 changes the parameter of the cut area cut out by the sub image generator 384 from the main image corresponding to the image data generated by the imaging unit 27, in accordance with the operation of the operation ring 371. Accordingly, it is possible to change and capture two areas having different views easily without missing a chance to capture the subject.

Further, with the first embodiment of the invention, the user only has to operate the operation ring 371 toward the subject and so it is possible to reduce image blur of the subject caused by camera shake.

According to the first embodiment of the invention, the cut area is cut out in a rectangular shape from the main image by the sub image generator 384, but alternatively the cut area may be cut out in a round or triangular, shape.

Further, according to the first embodiment of the invention, the cut area is cut out from the main image in such a way that the rectangular area is horizontally extended, but alternatively the rectangular area may be vertically expanded. In this case, the parameter change unit 385 may switch a direction of cutting out the area from the main image by the sub image generator 384, either horizontally or vertically, based on a moving speed of the tracked subject set by the tracked subject setting unit 383. Further, the parameter change unit 385 may change a ratio of the size and position of the cut area by the operation of the operation ring 371 according to the moving speed of the tracked subject.

Second Embodiment

Next, a second embodiment of the invention is described. The imaging device of the second embodiment of the invention has the same configuration as that of the above-described embodiment but processes are different. Therefore, for the second embodiment, only the process performed by the imaging device is described. In the following description, the same components are designated by the same reference numerals.

Figure 21A:
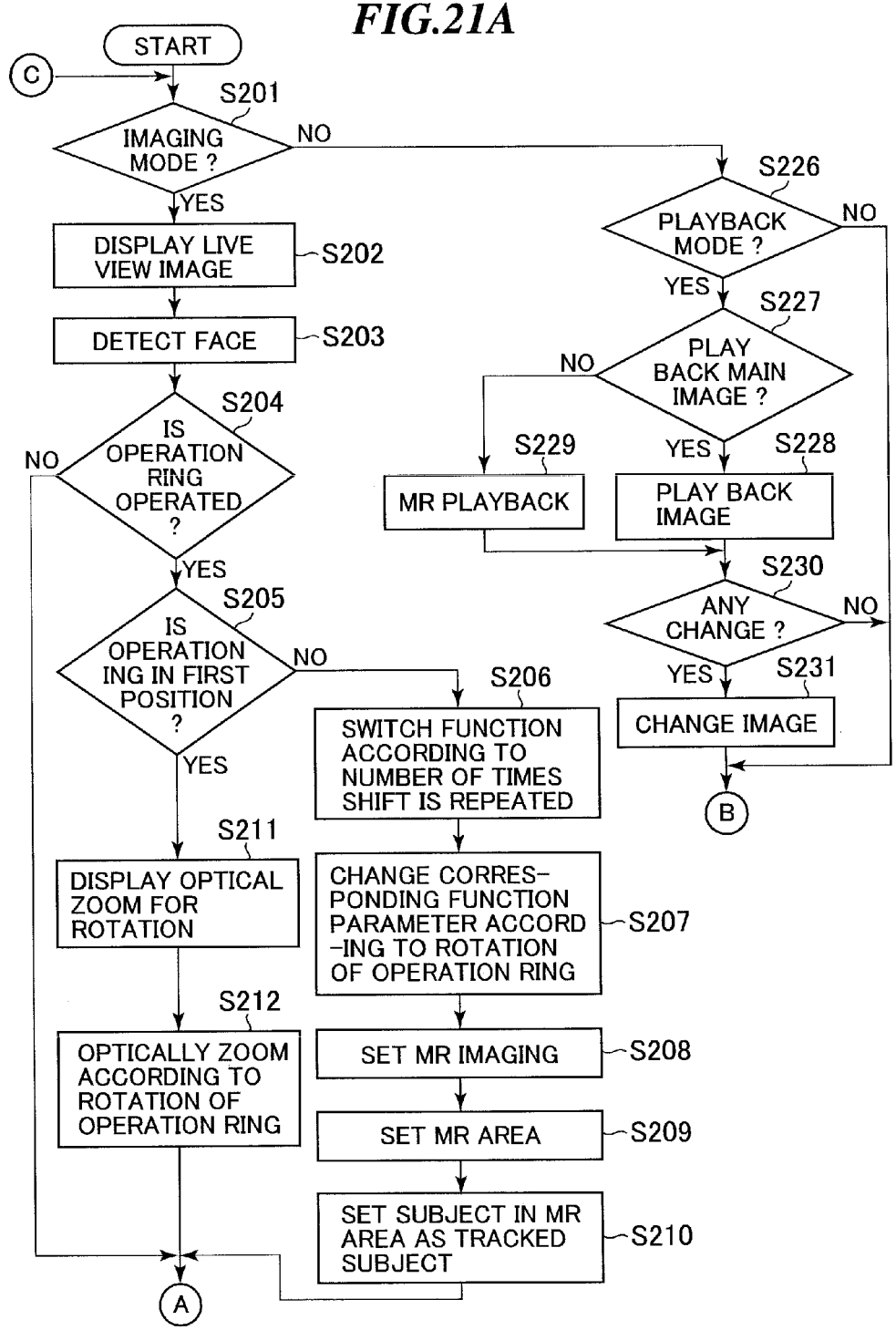
Figure 21B:
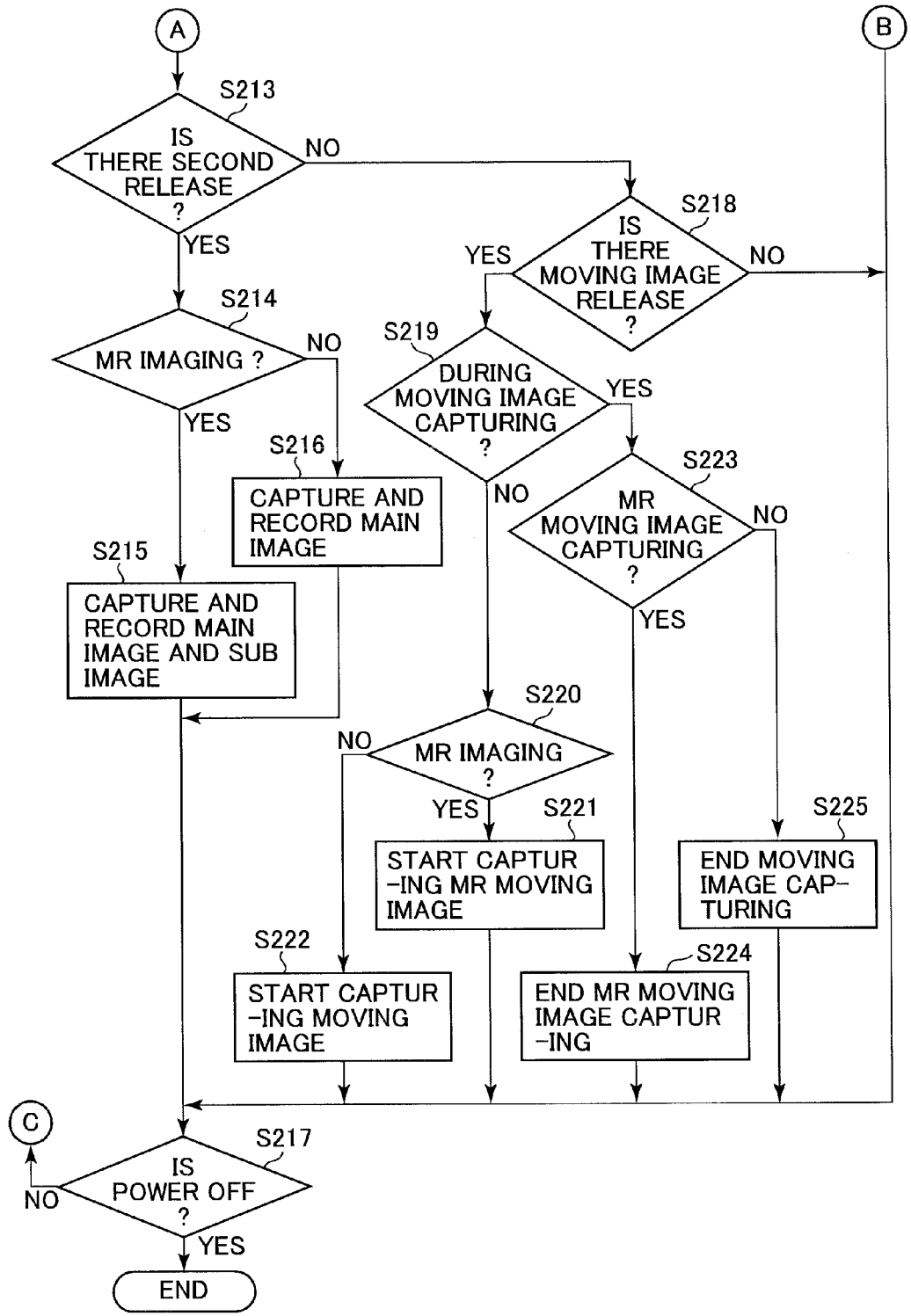

FIG. 21 is a flowchart illustrating an outline of processing performed by the imaging device according to a second embodiment of the invention.

In FIG. 21, steps S201 to S205 correspond, respectively, to steps S101 to S105 described above.

Figure 22:
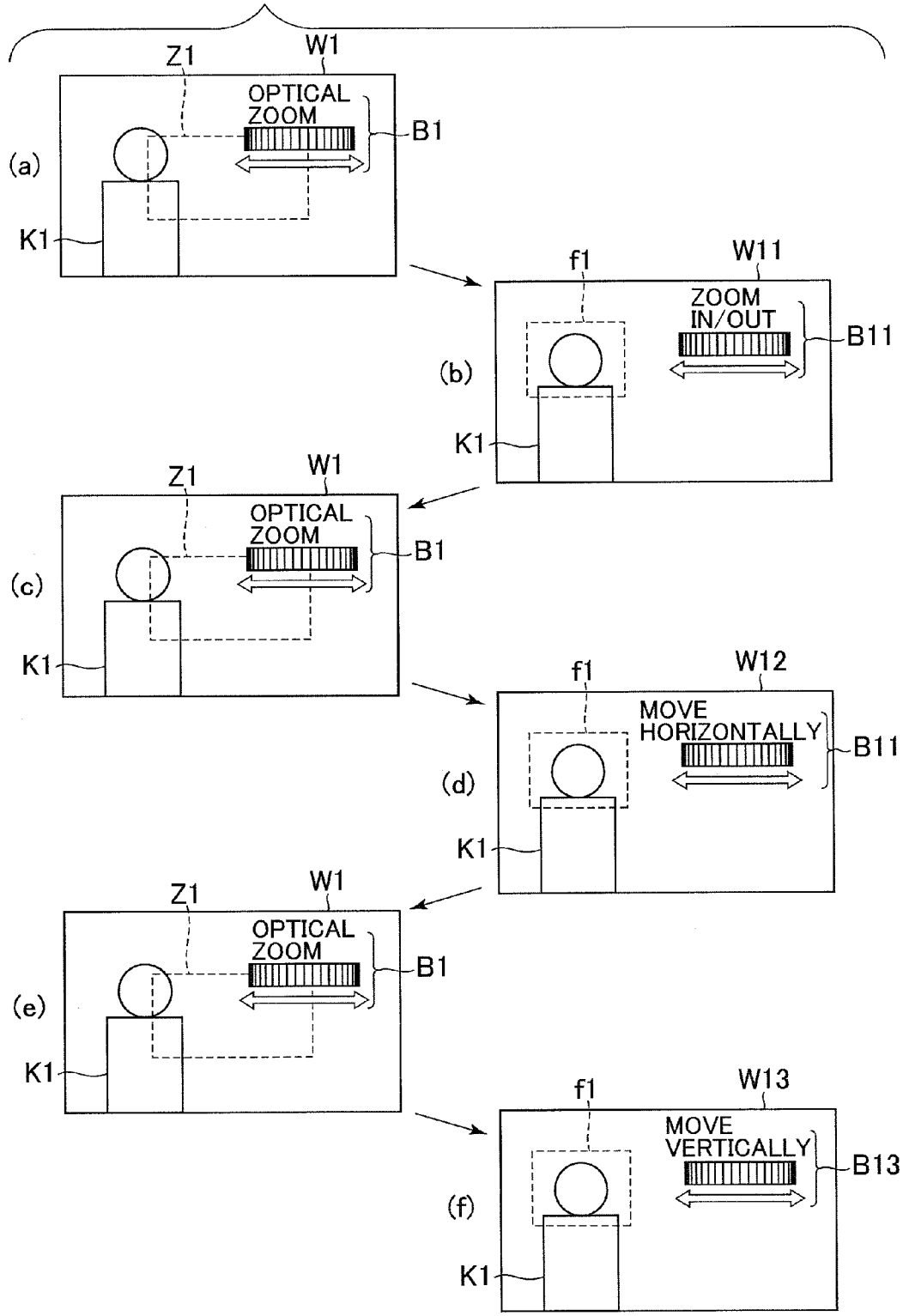
FIGS. 22(a)-22(f) are views illustrating an example of an image displayed on the display unit in accordance with an operation of the operation ring.

At step S206, the controller 38 changes a corresponding function mode in accordance with the number of times shift of the operation ring 371 from the first position F1 to the second position F2 along the direction of the optical axis O is repeated. Specifically, the controller 38 changes the corresponding function mode in accordance with the number of times the user moves (shifts) the operation ring 371 from the first position F1 (see FIG. 13) to the second position F2 (see FIG. 15) along the direction of the optical axis O. For example, as shown in FIG. 22, the controller 38 switches the corresponding function mode of the imaging device 1 in order from optical zoom, setting the area of the sub image, optical zoom, a horizontal position of the sub image in the main image, optical zoom, and a vertical position of the sub image in the main image in accordance with the number the operation ring 371 is shifted (FIGS. 22 (a)-(b)). Accordingly, the user repeats shifting the operation ring 371 from the first position F1 to the second position F2 along the direction of the optical axis O and can easily change the corresponding function mode of the imaging device 1 with maintaining a photographic composition.

Steps S207 to S210 correspond, respectively, to steps S109 to S112 described above. The parameter change unit 385 more gradually changes the corresponding function parameters of the imaging device 1 than those in the embodiment described above. If the corresponding function parameters of the imaging device 1 are changed continuously and smoothly and the sub image is set to a substandard area (for example, aspect ratio), processing to adjust the sub image within a standard is required and processing of the controller 38 is increased. On the other hand, according to the second embodiment of the invention, the corresponding function parameters are gradually changed and the area of the sub image is gradually changed (for example, aspect ratios are changed as follows: 16:9→4:3→2:3), which enables simplifying the processing of the controller 38. Further, intuitive recognition is possible for the user by operating the operation ring 371.

Steps S211 and S212 correspond, respectively, to steps S106 and S107 described above.

Steps S213 to S231 correspond, respectively, to steps S113 to S131 described above.

According to the above-described second embodiment of the invention, the parameter change unit 385 changes the parameters of the cut area to be cut out by the sub image generator 384 from the main image corresponding to the image data generated by the imaging unit 27, in accordance with the operation of the operation ring 371. Accordingly, it is possible to change and capture two areas having different views easily without missing a chance to capture the subject.

Further, according to the second embodiment of the invention, it is possible to change the parameter of the cut area to be cut out from the main image by the sub image generator 384 by moving the operation ring 371 forward and backward along the direction of the optical axis O.

Third Embodiment

Next, a third embodiment of the invention is described. The imaging device of the third embodiment of the invention has a different configuration from that of the first embodiment. Specifically, with respect to the first embodiment described above, operation ring characteristics are switched by moving the operation ring along the optical axis. However, with respect to the imaging device of the third embodiment of the invention, operation ring characteristics are switched by an input unit or, an input unit provided to a lens barrel. Thus, with respect to the third embodiment of the invention, only the configuration of the imaging device is described. In the following description, the same components are designated by the same reference numerals.

Figure 23:
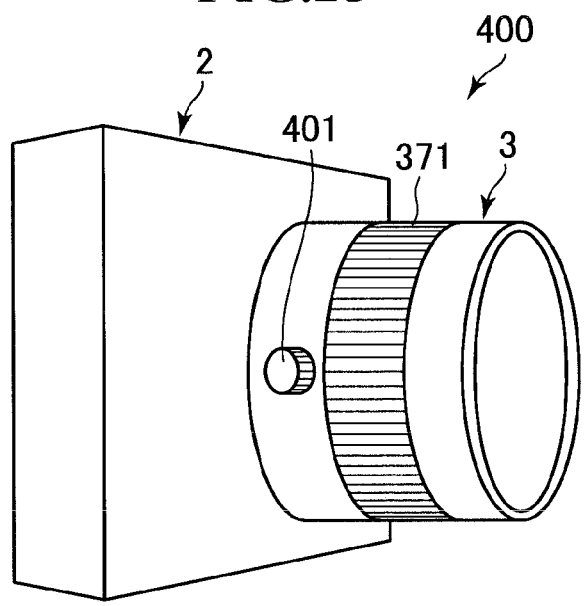
FIGS. 23 and 24 are diagrams illustrating a configuration of a front-side perspective view of the imaging device in which a push button changes an operating state of a ring-shaped operation ring.

FIG. 23 is a diagram illustrating a configuration of a side of the imaging device facing a subject according to the third embodiment of the invention. An imaging device 400 shown in FIG. 23 includes a push-type input unit provided on a side of the lens barrel 3. An input unit 401 receives input of an instruction signal that switches between first and second states in which operational feelings differ from each other when operating rotation of the operation ring 371. In response to the instruction signal input from the input unit 401, the controller 38 controls drive of the actuator driver 373 and adjusts a frictional force of the actuator 372 that presses the operation ring 371 in the radial direction to switch the operational feeling when operating rotation of the operation ring 371 between the first or second states. At this time, the parameter change unit 385 may change the angle of view of the optical system 21 and/or the position of the cut area to be cut out by the sub image generator 384 from the image data, in accordance with the state of the operation ring 371.

According to the third embodiment of the invention described above, the user is able to perform a desired operation when the operational feeling of the operation ring 371 is changed.

Further, according to the third embodiment of the invention, when the operation ring 371 clicks, that is suitable for digital mode switching. On the other hand, when the operation ring 371 does not click, that is suitable for analog position switching.

Further, the third embodiment of the invention can be applied to the main frame 2 and a lens device detachable from the main frame 2.

In the third embodiment, as shown in FIG. 23, a switch for switching between applying and stopping the voltage to the actuator (piezoelectric element) 372c may be operated by pressing the input unit 401. Not only electrical switching but also mechanical switching can be employed. More particularly, a mechanism including a piezoelectric element or the like is provided near the switch so that when the input unit 401, of FIG. 23 is pushed down, the flat spring 372h of FIGS. 6 and 7 is pushed and bent. With this mechanism, it is possible to switch between providing clicking sensation or not.

Figure 24:
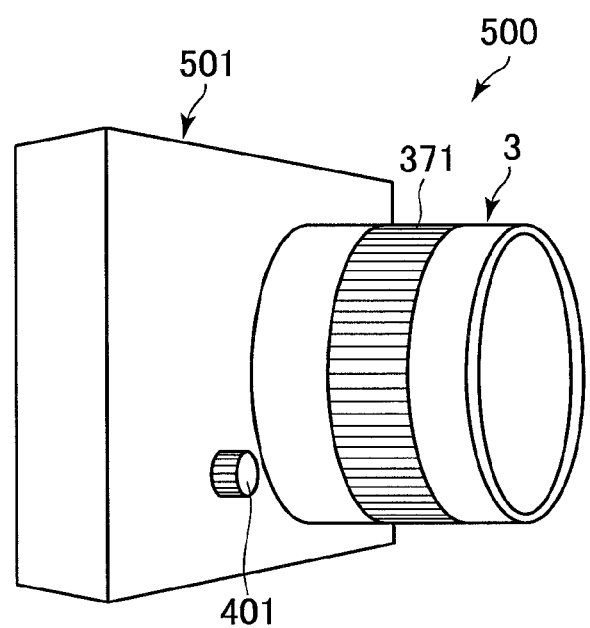

With respect to the third embodiment of the invention, the input unit 401 may be provided at a subject side of a housing 501 of an imaging device 500 shown in FIG. 24.

Further, a switch for switching between applying and stopping the voltage to the actuator (piezoelectric element) 372c may be operated by pressing the input unit 401 of FIG. 24. Not only electrical switching but also mechanical switching can be employed. More particularly, a mechanism including a piezoelectric element or the like is provided near the switch so that when the input unit 401 of FIG. 24 is pushed down, the flat spring 372h of FIGS. 6 and 7 is pushed and bent. With this mechanism, it is possible to switch between providing clicking sensation or not. Furthermore, when the input unit 401 of FIG. 24 is pushed down, a wedge-shaped member is slid and the flat sprint can be bent.

Figure 25:
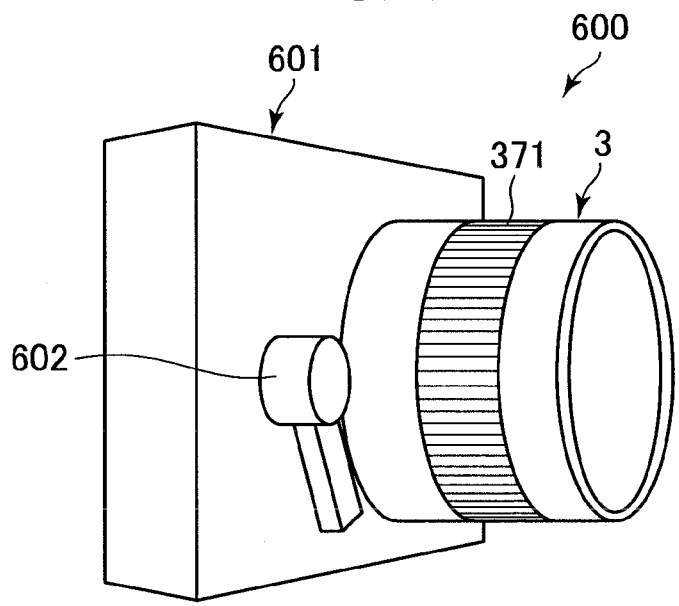
FIGS. 25 and 26 are diagrams illustrating a configuration of a front-side perspective view of the imaging device in which a lever type input unit changes an operating state of a ring-shaped operation ring.
Figure 26:
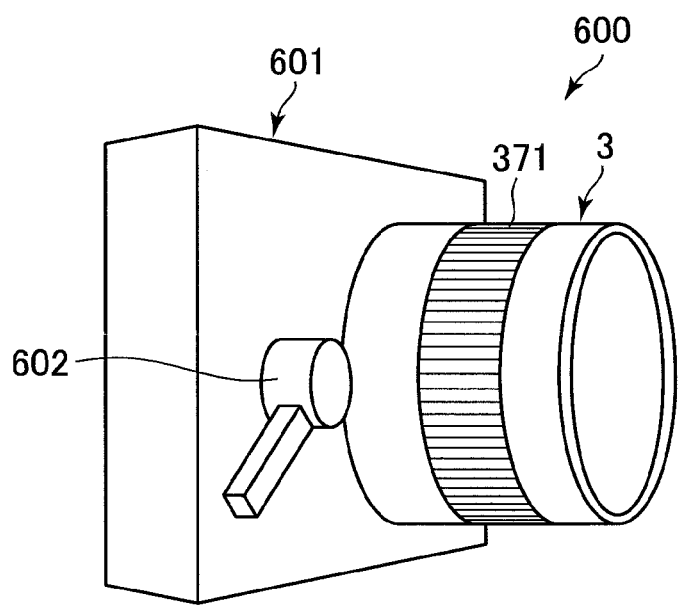

Further, with respect to the third embodiment of the invention, a lever-type input unit 602 may be provided at a subject side of a housing 601 of an imaging device 600 shown in FIGS. 25 and 26. Accordingly, in a lens-integrated imaging device, there is no need to incorporate an input unit into a small barrel and so freedom of design is increased.

A switch for switching between applying and stopping the voltage to the actuator (piezoelectric element) 372c may be operated by moving the lever-type input unit 602 of FIGS. 25 and 26. Not only electrical switching but also mechanical switching can be employed. Furthermore, when the lever-type input unit 602 of FIGS. 25 and 26 is operated, a pinion rotates and a rack is moved so that a wedge portion can deform the flat spring to change the height (for example, a gap between the ball 372a and the recess 371a). With this operation, it is possible to switch between providing clicking sensation or not. There may be provided another mechanism in which in conjunction with a gear train having a protruding pin, the height of the flat spring is changed according to the protruding pin.

Further, with respect to the third embodiment of the invention, the above-described input units can be used appropriately in combination.

Other Embodiments

In the above-described embodiments, the lens barrel including the optical system is integrally formed with the main frame. However, the embodiments can be applied to other imaging device systems such as a digital single-lens reflex camera provided with a lens device detachable from a main frame. For this case, an operation ring of the operation unit may be provided to a lens barrel of a lens device so as to be rotated about the optical axis in such a manner that a parameter controller of a main frame changes the parameter of the cut area to cut out from a main image by a sub image generator and generate a sub image, in accordance with the operation of the operation ring.

In the above-described embodiments, the operation ring provided to the lens barrel is described. However, as shown in FIGS. 23 and 24, the invention can be applied to a push-type switch, for example.

In the above-described embodiments, the actuator is a piezoelectric element. However, the invention can be applied to, for example, a linear motor, a voice coil motor, and a polymer actuator.

In the above-described embodiments, the angle of view of the optical system, the size of the cut area, and the cut out position in the main image are changed as a parameter of the cut area of the sub image generator. However, exposure, sensitivity, and white balance may be changed, for example. Further, contents of the image processing by the image processor may be changed. For example, a special effect operation for visual effects may be performed by a combination of a plurality of image processing operations, such as a combination of soft focus, shading, white out, and the like.

In the above-described embodiments, capturing moving images successively generated by the imaging unit is explained as an example. However, the invention can be applied to continuous shooting by which still images are continuously generated.

In the above-described embodiments, the finder is detachable from the main frame. However, the finder may be integrally formed with the main frame.

In the above-described embodiments, the image processor and the sub image generator are incorporated into the controller. However, the image processor and the sub image generator may be separately provided, for example. Further, a plurality of image processors (image engine) may be provided.

In the above-described embodiments, the images are separately displayed on both the finder display unit and the display unit. However, the invention can be applied to a display monitor that has two display units, for example. Specifically, the invention can be applied to a mobile phone, a multifunctional terminal, and the like with two display areas.

In the above-described embodiments, tactile sensation of the operation ring is explained as a click sound, frictional force, and operational feelings (resistance) of the operation ring.

Besides compact digital cameras and digital single-lens reflex cameras, the imaging device according to the invention can be applied to electronic devices, such as a digital camcorder to which an accessory is attached and a mobile phone and a tablet mobile phone with a shooting function.

The description of the flowcharts uses expressions "first", "after that", "subsequently", and the like in order to explain before-and-after relationship between the steps of each process. However, the procedure of the necessary process to implement the invention is not uniquely defined by those expressions. The procedure of the process of the flowcharts in this patent specification can be changed without departing from the scope and spirit of the invention.

In some embodiments, an imaging device includes: a lens barrel including an optical system that collects light from a predetermined viewing area and that defines an optical axis; an imaging unit that receives the light collected by the optical system and generates image data, the image data defining a main image that includes a determined sub-area; a ring-shaped operation ring that is provided on an outer circumference of the lens barrel and that is manually rotatable about the optical axis of the optical system; and an area change unit that changes at least one of (A) a size of the determined sub-area, or (B) a position of the determined sub-area, responsive to a manual operation of the operation ring.

In some embodiments, an imaging device includes: a lens barrel including an optical system that collects light from a predetermined viewing area and that defines an optical axis; an imaging unit that receives the light collected by the optical system and generates image data; a post-processor that processes the image data generated by the imaging unit; a controller that controls (1) an image capturing operation of the imaging unit, and (2) a processing operation of the post-processor; a ring-shaped operation ring that is provided on an outer circumference of the lens barrel and that is both manually rotatable about the optical axis of the optical system and manually slideable between first and second positions along a direction of the optical axis; and a parameter change unit that changes a parameter of at least one of the image capturing operation of the imaging unit or the processing operation of the post-processor, responsive to a manual operation of the operation ring.

In some embodiments, an imaging device includes: a lens barrel including an optical system that collects light from a predetermined viewing area and that defines an optical axis; an imaging unit that receives the light collected by the optical system and generates image data; a ring-shaped operation ring—being provided on an outer circumference of the lens barrel, —being manually rotatable about the optical axis of the optical system, —having a first operating state under which manual rotation of the ring-shaped operation ring by a user provides a first type of haptic/tactile feedback to the user, and—having a second operating state under which manual rotation of the ring-shaped operation ring by a user provides a second type of haptic/tactile feedback to the user; and a switching unit for changing an operation mode of the ring-shaped operation ring between the first operating state and the second operating state.

In the imaging device, the first type of haptic/tactile feedback provides a smooth sensation to the operator, and wherein the second type of haptic/tactile feedback provides a clicking sensation to the operator.

In the imaging device, the first operating state performs an analog operation in accordance with the manual rotation of the ring-shaped operation ring, and the second operating state performs a digital operation in accordance with the manual rotation of the ring-shaped operation ring.

In the imaging device, the analog operation performs at least one of (A) focusing in accordance with the manual rotation of the ring-shaped operation ring, and (B) zooming in accordance with the manual rotation of the ring-shaped operation ring.

In the imaging device, the digital operation adjusts at least one of (A) an exposure setting, (B) a sensitivity setting, (C) a white balance setting, (D) a shutter speed setting, (E) an aperture setting, (F) an aspect ratio setting, and (G) a special effect setting, in accordance with the manual rotation of the ring-shaped operation ring.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging device comprising:
    a lens barrel including an optical system that collects light from a predetermined viewing area and that defines an optical axis;
    an imaging unit that receives the light collected by the optical system and generates image data, the image data defining a main image that includes a determined sub-area;
    a ring-shaped operation ring that is provided on an outer circumference of the lens barrel and that is manually rotatable about the optical axis of the optical system; and
    an area change unit that changes at least one of (A) a size of the determined sub-area, or (B) a position of the determined sub-area, responsive to a manual operation of the operation ring, wherein
    the operation ring can move forward/backward between a first position and a second position along the direction of an optical axis, and the area change unit changes the angle of view of the optical system when the operation ring is positioned in the first position and the operation ring is rotated, and the area change unit changes the size of the determined sub-area or the position of the determined sub-area in the main image when the operation ring is positioned in the second position and the operation ring is rotated.

2. The imaging device according to claim 1, wherein the operation ring includes a plurality of notches on the side of the inner circumference of the operation ring in each of the first position and the second position, and the imaging device further comprising a pressing unit that is provided to the lens barrel, that can move forward/backward along a predetermined radial direction of the lens barrel, and that presses the inner circumference when the inner circumference of the operation ring other than the notches is positioned in at least the radial direction.

3. The imaging device according to claim 2, wherein a greater number of grooves are formed in the second position compared to those in the first position in the operation ring.

4. The imaging device according to claim 3, further comprising:

a face detector that detects the face of a subject that is contained in the main image; and an imaging controller that sets, as the determined sub-area in an initial stage, an area that contains the face detected by the face detector.

5. The imaging device according to claim 4, further comprising:

a tracked subject setting unit that sets, as a tracked subject that is tracked in the main image as the time elapses, the subject contained in the determined sub-area set by the imaging controller, wherein the area change unit changes the position of the determined sub-area according to movement of the tracked subject set by the tracked subject setting unit.

6. The imaging device according to claim 5, further comprising a recording unit that records the image data that is successively generated by the imaging unit in the order in which the image data is generated and records the sub image data, which is generated by the sub image generator by sequentially cutting out the determined sub-area from the main image, in the order in which the sub image data is generated.

7. An imaging device comprising:

a lens barrel including an optical system that collects light from a predetermined viewing area and that defines an optical axis;

an imaging unit that receives the light collected by the optical system and generates image data, the image data defining a main image that includes a determined sub-area;

a ring-shaped operation ring that is provided on an outer circumference of the lens barrel and that is manually rotatable about the optical axis of the optical system; and an area change unit that changes at least one of (A) a size of the determined sub-area, or (B) a position of the determined sub-area, responsive to a manual operation of the operation ring, wherein the operation ring can move forward/backward between a first position and a second position along the direction of an optical axis, and in accordance with the number of times the operation ring makes a round trip between the first position and the second position, the area change unit changes between the angle of view of the optical system, the size of the determined sub-area, and the position of the determined sub-area in the main image by sequentially switching the angle of view of the optical system, the size of the determined cut-area, and the position of the determined sub-area in the main image.

8. The imaging device according to claim 7, wherein the operation ring includes a plurality of recesses on the side of the inner circumference of the operation ring in each of the first position and the second position, and the imaging device further comprising a pressing unit that is provided to the lens barrel, that can move forward/backward along a predetermined radial direction of the lens barrel, and that presses the inner circumference when the inner circumference of the operation ring other than the notches is positioned in at least the radial direction.

9. The imaging device according to claim 8, wherein a greater number of the recesses are formed in the second position compared to those in the first position in the operation ring.

10. The imaging device according to claim 9, further comprising:

a face detector that detects the face of a subject that is contained in the main image; and an imaging controller that sets, as the determined sub-area in an initial stage, an area that contains the face detected by the face detector.

11. The imaging device according to claim 10, further comprising:

a tracked subject setting unit that sets, as a tracked subject that is tracked in the main image as the time elapses, the subject contained in the determined sub-area set by the imaging controller, wherein the area change unit changes the position of the determined sub-area according to movement of the tracked subject set by the tracked subject setting unit.

12. The imaging device according to claim 11, further comprising a recording unit that records the image data that is successively generated by the imaging unit in the order in which the image data is generated and records the sub image data, which is generated by the sub image generator by sequentially cutting out the determined sub-area from the main image, in the order in which the sub-image data is generated.

* * * * *